(12) United States Patent
Mizusawa et al.

(10) Patent No.: US 8,934,367 B2
(45) Date of Patent: Jan. 13, 2015

(54) TERMINAL APPARATUS, COMMUNICATION CONTROL APPARATUS, WIRELESS COMMUNICATION SYSTEM, AND COMMUNICATION CONTROL METHOD

(75) Inventors: Nishiki Mizusawa, Kanagawa (JP); Atsushi Yoshizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 13/550,857

(22) Filed: Jul. 17, 2012

(65) Prior Publication Data

US 2013/0034001 A1 Feb. 7, 2013

(30) Foreign Application Priority Data

Aug. 3, 2011 (JP) ................................ 2011-170035

(51) Int. Cl.
*H04W 72/08* (2009.01)
*H04W 16/14* (2009.01)
*H04W 88/06* (2009.01)

(52) U.S. Cl.
CPC ............. *H04W 16/14* (2013.01); *H04W 88/06* (2013.01)
USPC .......................................... 370/252; 370/329

(58) Field of Classification Search
CPC ..... H04W 16/10; H04W 16/14; H04W 24/10; H04W 88/02; H04W 88/06
USPC ....................... 370/252, 329; 455/63.1, 114.2
See application file for complete search history.

(56) References Cited

U.S. PATENT DOCUMENTS

2010/0197235 A1* 8/2010 Wilhelmsson ............... 455/63.3
2011/0149764 A1* 6/2011 Wietfeldt et al. ............ 370/252
2011/0243047 A1* 10/2011 Dayal et al. .................. 370/311
2011/0243094 A1* 10/2011 Dayal et al. .................. 370/331
2011/0256834 A1* 10/2011 Dayal et al. .................. 455/67.7
2012/0020229 A1* 1/2012 Dayal et al. .................. 370/252
2012/0033645 A1* 2/2012 Mantravadi et al. .......... 370/336

(Continued)

FOREIGN PATENT DOCUMENTS

JP 2009-267678 11/2009

OTHER PUBLICATIONS

3GPP TS 36.101 V10.0.0 (Oct. 2010). Technical Specification. 3rd Generation Partnership Project; Technical Specification Group Radio Access Network; Evolved Universal Terrestrial Radio Access (E-UTRA); User Equipment (UE) radio transmission and reception (Release 10). Oct. 2010.

*Primary Examiner* — Paul H Masur
(74) *Attorney, Agent, or Firm* — Wolf, Greenfield & Sacks, P.C.

(57) ABSTRACT

Provided is a terminal apparatus including a first communication unit that performs communication according to a first wireless communication scheme using frequency division duplex; a second communication unit that performs communication according to a second wireless communication scheme different from the first wireless communication scheme; a detecting unit that detects deterioration of reception quality of the first communication unit due to generation of the communication by the first communication unit and the communication by the second communication unit at the same timing; and a reporting unit that reports the deterioration of the reception quality to a communication control apparatus scheduling the communication by the first communication unit, when the deterioration of the reception quality is detected by the detecting unit.

6 Claims, 13 Drawing Sheets

(56) References Cited

U.S. PATENT DOCUMENTS

| | | | |
|---|---|---|---|
| 2012/0034913 A1* | 2/2012 | Wang et al. | 455/426.1 |
| 2012/0087341 A1* | 4/2012 | Jang et al. | 370/331 |
| 2012/0093009 A1* | 4/2012 | Wang et al. | 370/252 |
| 2012/0129457 A1* | 5/2012 | Linsky | 455/63.3 |
| 2012/0164948 A1* | 6/2012 | Narasimha et al. | 455/63.1 |
| 2012/0327869 A1* | 12/2012 | Wang et al. | 370/329 |
| 2013/0003671 A1* | 1/2013 | Wang et al. | 370/329 |
| 2013/0016635 A1* | 1/2013 | Linsky et al. | 370/280 |
| 2013/0064111 A1* | 3/2013 | Linsky et al. | 370/252 |
| 2013/0070653 A1* | 3/2013 | Banister et al. | 370/281 |
| 2013/0223391 A1* | 8/2013 | Koo et al. | 370/329 |
| 2013/0242919 A1* | 9/2013 | Koo et al. | 370/329 |
| 2013/0273857 A1* | 10/2013 | Zhang et al. | 455/73 |
| 2013/0329681 A1* | 12/2013 | Sebire | 370/329 |
| 2013/0337815 A1* | 12/2013 | Sebire | 455/438 |
| 2014/0031036 A1* | 1/2014 | Koo et al. | 455/434 |

* cited by examiner

TERMINAL APPARATUS, COMMUNICATION CONTROL APPARATUS, WIRELESS COMMUNICATION SYSTEM, AND COMMUNICATION CONTROL METHOD

CROSS REFERENCE TO RELATED APPLICATIONS

The present application claims priority under 35 U.S.C. §119 to Japanese Patent Application No. 2011-170035, filed in the Japan Patent Office on Aug. 3, 2011, the entire contents of which are hereby incorporated by reference.

BACKGROUND

The present disclosure relates to a terminal apparatus, a communication control apparatus, a wireless communication system, and a communication control method.

In a cellular communication system, frequency division duplex (FDD) refers to a mechanism for dividing an uplink signal and a downlink signal by a frequency. For example, in a Long Term Evolution (LTE) scheme, which is a new communication scheme following a 3G mobile communication scheme, FDD is used, except for in a time division (TD)-LTE scheme. Table 1 shows a list of frequency channels (bands) for the LTE standardized by 3GPP (Third Generation Partnership Project) which is described in "3GPP TS 36.101 v10.0.0."

TABLE 1

| E-UTRA Operating Band | Uplink (UL) bands $F_{UL\_Low}$-$F_{UL\_High}$ | Downlink (DL) bands $F_{DL\_Low}$-$F_{DL\_High}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| . | . | . | . |
| . | . | . | . |
| . | . | . | . |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Referring to Table 1, uplink (UL) frequencies of a band 7 are defined as 2500 MHz to 2570 MHz and downlink (DL) frequencies are defined as 2620 MHz to 2690 MHz and a frequency interval between the UL and DL is 120 MHz. Also, uplink (UL) frequencies of a band 5 are defined as 824 MHz to 849 MHz and downlink (DL) frequencies are defined as 869 MHz to 894 MHz and a frequency interval between the UL and DL is 45 MHz.

In the FDD, uplink transmission and downlink transmission can be performed at the same time. Meanwhile, in time division duplex (TDD), the uplink transmission and the downlink transmission are performed at different time slots. For example, in a wireless local area network (LAN) scheme such as IEEE802.11a/b/g/n, TDD is mainly adopted. When an industry-science-medical (ISM) band is used as a frequency channel of the wireless LAN, an uplink signal and a downlink signal are transmitted according to a time division scheme, in an ISM band of 2400 MHz to 2500 MHz.

In recent years, in such situations, the case in which a cellular communication system and other kinds of wireless communication systems such as the wireless LAN are used at the same time at places adjacent to each other is increasing. For example, some latest mobile routers support an Internet access function in the LTE scheme and provide high-speed Internet access through the LTE to a terminal apparatus connected by the wireless LAN scheme. In addition, there is the case in which a femtocell base station (small base station that is introduced to cover an area smaller than a macrocell) put to practical use in many countries supports a wireless LAN connection function.

SUMMARY

However, if communication is performed in an FDD mode according to a cellular communication scheme in a certain apparatus and communication is performed in parallel according to another wireless communication scheme in a casing of the same apparatus, quality of a signal that is transmitted or received according to the cellular communication scheme may be deteriorated. The deterioration in the signal quality is generated due to various factors, such as out-of-band noise, signal leakage between communication circuits, and generation of an interference wave due to intermodulation. Japanese Patent Application Publication No. 2009-267678 suggests technology for adaptively selecting a frequency channel when a plurality of wireless communication schemes are operated at the same time and avoiding interference between the plurality of wireless communication schemes. However, in actuality, the selection of the frequency channel is limited by various aspects such as a technical aspect, a legal aspect, and a specification aspect. For this reason, there is a limitation in avoiding the interference by the adaptive channel selection.

Therefore, it is desired to provide a mechanism capable of suppressing a parallel operation of communication according to an FDD mode and communication according to another wireless communication scheme and maintaining desired quality when the signal quality is deteriorated.

According to an embodiment of the present disclosure, there is provided a terminal apparatus which includes a first communication unit that performs communication according to a first wireless communication scheme using frequency division duplex, a second communication unit that performs communication according to a second wireless communication scheme different from the first wireless communication scheme, a detecting unit that detects deterioration of reception quality of the first communication unit due to generation of the communication by the first communication unit and the communication by the second communication unit at the same timing, and a reporting unit that reports the deterioration of the reception quality to a communication control apparatus scheduling the communication by the first communication unit, when the deterioration of the reception quality is detected by the detecting unit.

According to another embodiment of the present disclosure, there is provided a communication control apparatus which includes a first communication unit that performs communication according to a first wireless communication scheme using frequency division duplex, a scheduling unit that schedules communication by the first communication unit, and a detecting unit that detects deterioration of reception quality due to generation of communication performed according to the first wireless communication scheme and communication performed according to a second wireless communication scheme different from the first wireless communication scheme at the same timing. When the deterioration of the reception quality is detected by the detecting unit, the scheduling unit schedules the communication by the first communication unit preferentially at timing when the reception quality is not deteriorated.

According to another embodiment of the present disclosure, there is provided a wireless communication system which includes a communication control apparatus that schedules communication performed according to a first wireless communication scheme using frequency division duplex and a terminal apparatus that includes a first communication unit that performs communication according to the first wireless communication scheme, a second communication unit that performs communication according to a second wireless communication scheme different from the first wireless communication scheme, a detecting unit that detects deterioration of reception quality of the first communication unit due to generation of the communication by the first communication unit and the communication by the second communication unit at the same timing, and a reporting unit that reports the deterioration of the reception quality to the communication control apparatus, when the deterioration of the reception quality is detected by the detecting unit. When the deterioration of the reception quality is reported from the terminal apparatus, the communication control apparatus schedules the communication performed according to the first wireless communication scheme preferentially at timing when the reception quality is not deteriorated.

According to another embodiment of the present disclosure, there is provided a communication control method that is executed by a terminal apparatus which includes a first communication unit performing communication according to a first wireless communication scheme using frequency division duplex and a second communication unit performing communication according to a second wireless communication scheme different from the first wireless communication scheme. The communication control method includes detecting deterioration of reception quality of the first communication unit due to generation of the communication by the first communication unit and the communication by the second communication unit at the same timing and reporting the deterioration of the reception quality to a communication control apparatus scheduling the communication by the first communication unit, when the deterioration of the reception quality is detected.

According to the embodiments of the present disclosure described above, parallel communication can be dynamically suppressed and desired quality of a signal transmitted in an FDD mode can be maintained.

DETAILED DESCRIPTION OF THE EMBODIMENT(S)

Figure 1:
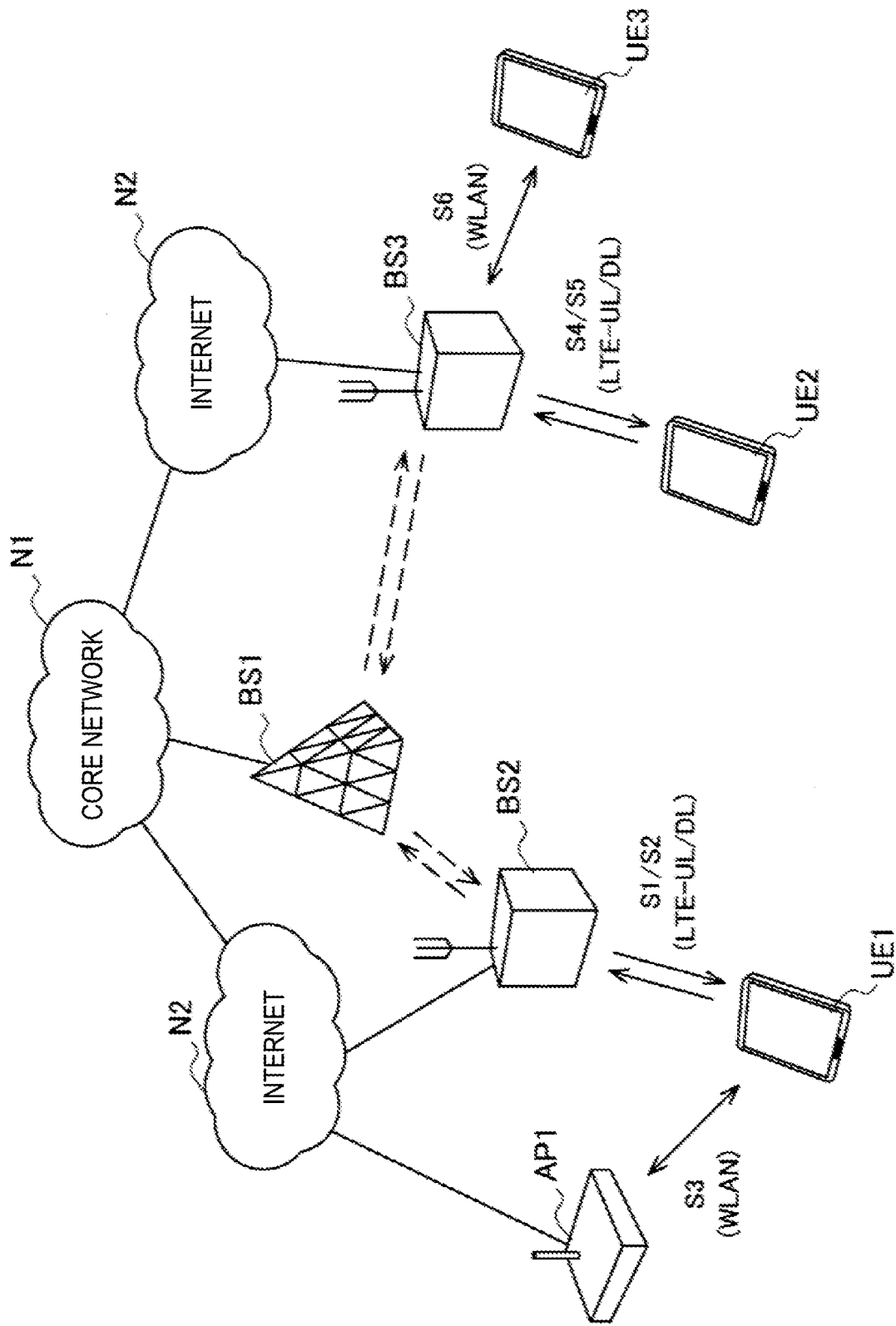
FIG. 1 is a diagram showing a wireless communication system to which technology related to the present disclosure is applicable.
Figure 2:
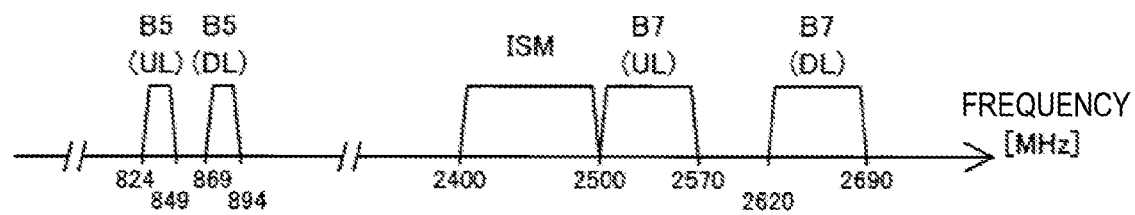
FIG. 2 is a diagram showing an example of an arrangement of frequency channels.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. Outline of Present Disclosure
   1-1. Outline of System
   1-2. Description of Problems
2. First Embodiment
   2-1. Example of Configuration of Terminal Apparatus
   2-2. Example of Configuration of Communication Control Apparatus
   2-3. Modification
   2-4. Example of Flow of Processing
   2-5. Summary of First Embodiment
3. Second Embodiment
   3-1. Example of Configuration of Communication Control Apparatus
   3-2. Example of Flow of Processing
   3-3. Summary of Second Embodiment
4. Generalization

1. Outline of Present Disclosure

First, an outline of the present disclosure will be described using FIGS. 1 to 4.

[1-1. Outline of System]

FIG. 1 is a diagram showing a wireless communication system to which technology related to the present disclosure is applicable. Referring to FIG. 1, a base station BS1, communication control apparatuses BS2 and BS3, terminal apparatuses UE1, UE2, and UE3, and an access point AP1 are shown.

The base station BS1 is a communication control apparatus that provides wireless communication services in an FDD mode according to a cellular communication scheme, to terminal apparatuses positioned in a cell around the base station BS1. In the present disclosure, an LTE scheme will be mainly described as an example of the cellular communication scheme. However, the present disclosure is not limited to the above example and may be applied to other kinds of cellular communication schemes such as LTE-advanced (LTE-A), wideband-code division multiple access (W-CDMA), and CDMA2000. When the base station BS1 supports the LTE scheme, the base station BS1 is called an LTE evolved node-B (eNB). The base station BS1 is connected to a core network N1 of a cellular communication system.

The communication control apparatuses BS2 and BS3 are communication control apparatuses that complementarily provide wireless communication services in an area smaller than the cell of the base station BS1. The communication control apparatuses BS2 and BS3 may be femtocell base stations that cover a femtocell to be an area smaller than a macrocell. Instead, each apparatus may be a mobile router or a wireless relay station that is connected to the base station BS1. The communication control apparatuses BS2 and BS3 are connected to the Internet N2 and can access the core network N1 through the Internet N2.

The terminal apparatuses UE1, UE2, and UE3 are wireless communication terminals. The terminal apparatuses UE1, UE2, and UE3 may be any kinds of wireless communication terminals such as smart phones, personal computers (PCs), personal digital assistants (PDAs), and portable navigation devices (PNDs).

The access point AP1 is an apparatus that provides wireless communication services to terminal apparatuses positioned in a service area around the access point AP1. In this case, an example in which a wireless communication scheme supported by the access point AP1 is a wireless LAN (WLAN) scheme such as IEEE802.11a/b/g/n will be mainly described. However, the wireless communication scheme that is supported by the access point AP1 may be another kind of wireless communication scheme such as IEEE802.16e (WiMAX).

The terminal apparatus UE1 can simultaneously use the communication control apparatus BS2 and the access point AP1 that are positioned around the terminal apparatus UE1. That is, the terminal apparatus UE1 performs communication in an FDD mode according to the LTE scheme, between the communication control apparatus BS2 and the terminal apparatus UE1 and performs communication according to the wireless LAN scheme, between the access point AP1 and the terminal apparatus UE1. Transmission of an uplink signal S1 and transmission of a downlink signal S2 between the terminal apparatus UE1 and the communication control apparatus BS2 are performed at the same time. Transmission of a wireless signal S3 between the terminal apparatus UE1 and the access point AP1 is performed at the same time as the transmission of the uplink signal S1 and the downlink signal S2.

The communication control apparatus BS3 supports a wireless LAN connection function, in addition to the wireless communication according to the LTE scheme. The communication control apparatus BS3 can be used simultaneously by the terminal apparatuses UE2 and UE3 that are positioned around the communication control apparatus BS3. For example, the terminal apparatus UE2 performs communication in the FDD mode according to the LTE scheme, between the communication control apparatus BS3 and the terminal apparatus UE2. The terminal apparatus UE3 performs communication according to the wireless LAN scheme, between the communication control apparatus BS3 and the terminal apparatus UE3. Transmission of an uplink signal S4 and transmission of a downlink signal S5 between the terminal apparatus UE2 and the communication control apparatus BS3 are performed at the same time. Transmission of a wireless signal S6 between the terminal apparatus UE3 and the communication control apparatus BS3 is performed at the same time as the transmission of the uplink signal S4 and the downlink signal S5.

As such, in the case in which the cellular communication and other kind of wireless communication are performed simultaneously in places adjacent to each other (for example, in a casing of the same apparatus), when the cellular communication adopts the FDD mode in particular, three kinds of signals may interfere with each other. As a result, the following problems are caused.

[1-2. Description of Problems]

An apparatus that supports the cellular communication scheme of the FDD mode includes a circuit element such as a filter and an amplifier having a characteristic of enabling the uplink transmission and the downlink transmission to be performed at the same time, in a communication circuit. In addition, a circuit element that has resistance to an interference wave of a level defined by the specification of the cellular communication scheme is designed. For example, according to "3GPP (Third Generation Partnership Project) TS 36.101 v10.0.0" described above, predetermined error rate requirements are regulated, even when interference waves of input levels such as "out-of-band blocking: −15 dBm" and "Spurious Response: −44 dBm" are received, in the terminal apparatus that supports the FDD-LTE scheme. With respect to the base station, similar requirements are regulated. A maker of each apparatus pursues a hardware design to meet these requirements. Therefore, if only the cellular communication scheme is used, even when the uplink transmission and the downlink transmission are performed at the same time, this does not cause the reception quality to be deteriorated.

However, when other kinds of wireless communication are performed simultaneously in the casing of the same apparatus, the following three kinds of phenomena that become the cause of the excessive deterioration of the reception quality are generated.

(1) Generation of Reception Band Noise
(2) Deterioration of Linearity of Amplifier
(3) Influence of Spurious Response (1) Generation of Reception Band Noise Power of a transmission signal that is generated on a certain frequency channel from an antenna of one communication circuit generates out-of-band noise on another frequency channel. When the out-of-band noise is generated on a reception band of the other communication circuit, reception quality in the other communication circuit is deteriorated. For example, referring to FIG. 2, the band 7 (B7) of the LTE and the ISM band come extremely close to each other. Therefore, the power of the transmission signal that is generated on the frequency channel in one band may generate the out-of-band noise of a high level in the other band.

(2) Deterioration of Linearity of Amplifier

The transmission signal that is generated from the antenna of one communication circuit may deteriorate the linearity of a reception amplifier of the other communication circuit. In particular, when the distance between the communication circuits is short, the transmission signal from the antenna of one communication circuit may be input to the other communication circuit with an excessive level (for example, about 0 dBm). Thereby, the linearity of the reception amplifier is excessively deteriorated and the reception quality is deteriorated. For example, referring to FIG. 2 again, the band 7 (B7) of the LTE and the ISM band come extremely close to each other and it is difficult to design a band-pass filter that reliably passes the signal of one band and attenuates the signal of the other band. Therefore, it is difficult to prevent the transmission signal generated on the frequency channel in one band from deteriorating the linearity of the reception amplifier of the communication circuit using the frequency channel in the other band as the reception band.

(3) Influence of Spurious Response

When the transmission frequency of one communication circuit corresponds to a reception spurious response frequency of the other communication circuit, the frequency of the transmission signal from one communication circuit is converted and the transmission signal becomes noise on the reception band of the other communication circuit. An interference wave having a frequency corresponding to an intermodulation product of the transmission signals from the two communication circuits is input to the reception band due to non-linearity of the reception amplifier and the quality of the signals that are received simultaneously in the FDD mode in particular is deteriorated.

Figure 3:
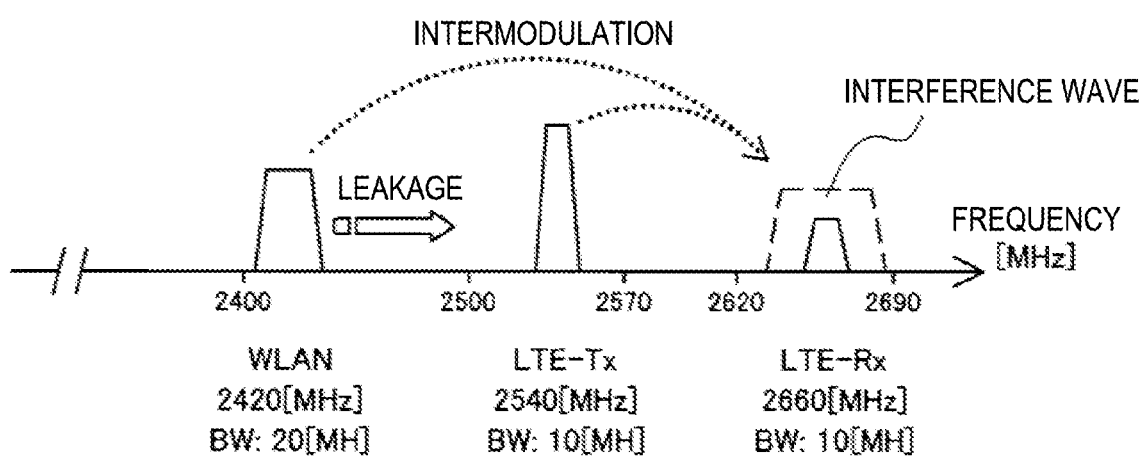
FIG. 3 is a first diagram showing an example of the cause of deterioration of signal quality.

For example, in an arrangement of frequency channels shown in FIG. 3, an interval of a transmission frequency channel (LTE-Tx, 2540 MHz) and a reception frequency channel (LTE-Rx, 2660 MHz) of the LTE is 120 MHz. In addition, an interval of a frequency channel (WLAN, 2420 MHz) of the wireless LAN and a transmission frequency channel of the LTE is 120 MHz. In this case, an interference wave of third-order intermodulation is generated in a band higher than the frequency channel of the wireless LAN by 120 MHz×2=240 MHz and a band of the interference wave overlaps the reception frequency channel of the LTE.

Figure 4:
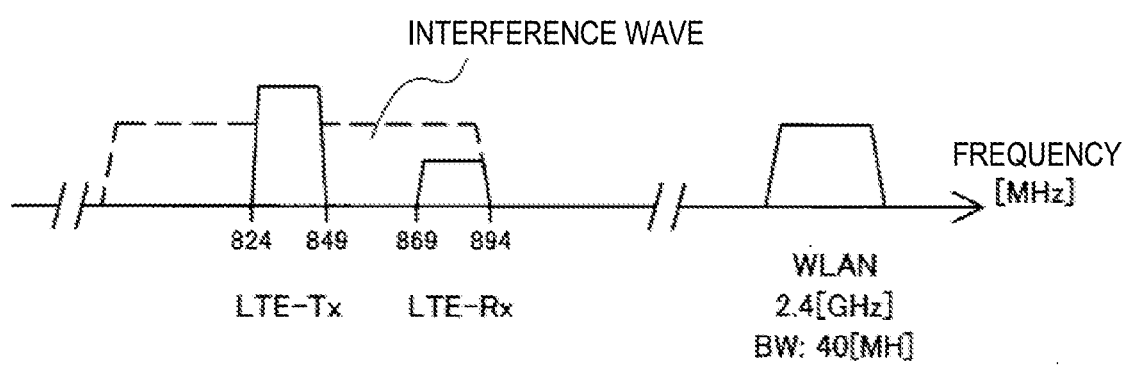
FIG. 4 is a second diagram showing an example of the cause of deterioration of signal quality.

For example, in an arrangement of frequency channels shown in FIG. 4, a bandwidth of the frequency channel (WLAN, 2.4 GHz) of the wireless LAN is 40 MHz. In this case, an interference wave of third-order intermodulation is generated in a band of 40 MHz before and after the transmission frequency channel (LTE-Tx) of the LTE. The reception frequency channel (LTE-Rx) of the LTE overlaps the band of the interference wave.

Preventing the deterioration of the reception quality caused by the phenomena described above by only the hardware design is unrealistic, because a size of hardware and a cost are increased according to an increase in the number of filters and an increase in an interval of antennas. In a general terminal apparatus that is operated in the FDD mode, a duplexer that separates a transmission band and a reception band is disposed on the output side of an antenna switch. For this reason, when linearity of the antenna switch mounted on a semiconductor switch causes a problem, there is little room to improve a characteristic by adding a filter. In a situation in which the selection of the frequency channel is limited by various aspects, it is difficult to avoid the deterioration of the reception quality by the adaptive channel selection suggested in Japanese Patent Application Publication No. 2009-267678.

Therefore, in two embodiments to be described below, a mechanism for suppressing parallel communication when deterioration of reception quality of a signal is detected is introduced to maintain desired quality, in a situation in which the cellular communication and other kind of wireless communication can be performed at the same time.

2. First Embodiment

Figure 5:
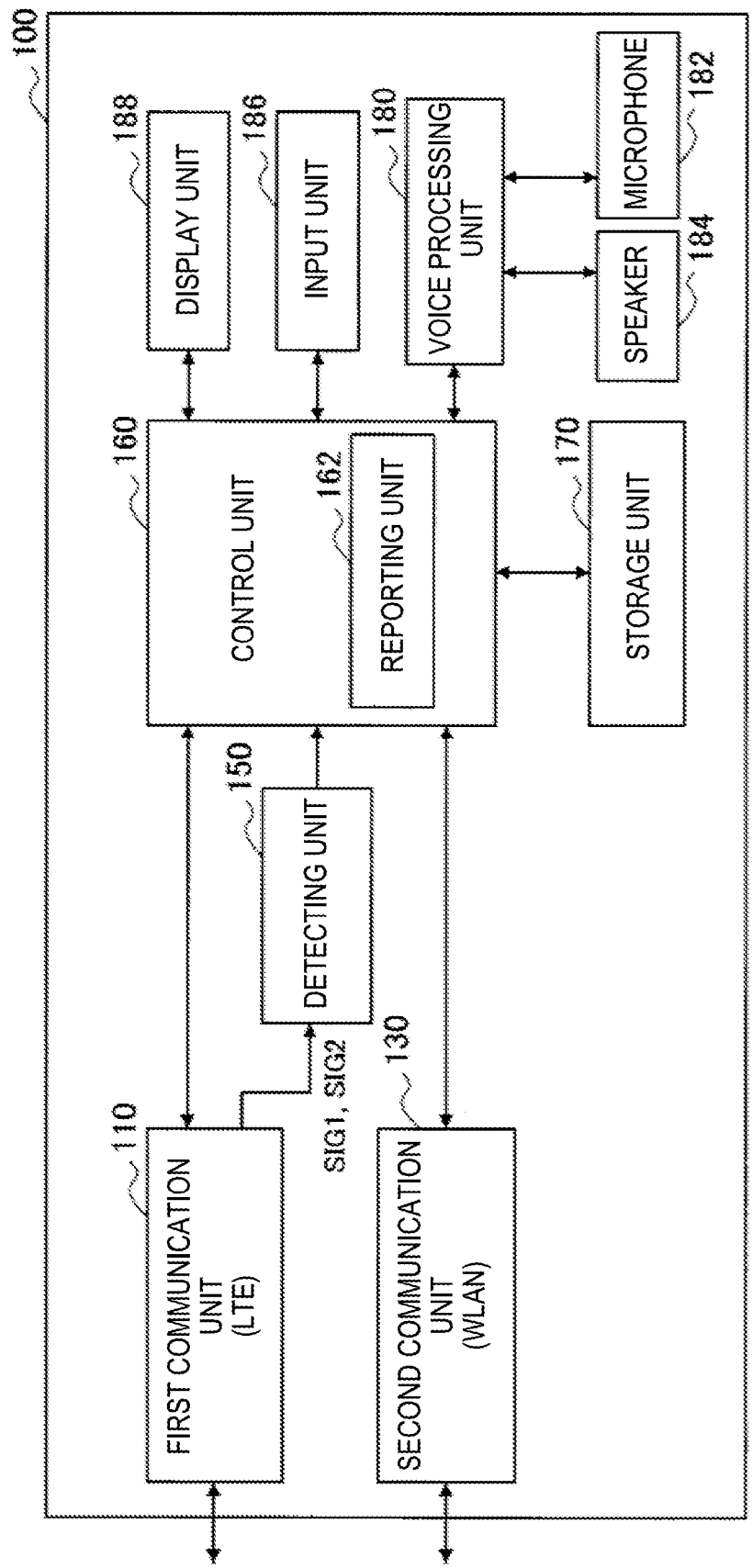
FIG. 5 is a block diagram showing an example of a configuration of a terminal apparatus according to a first embodiment.
Figure 8:
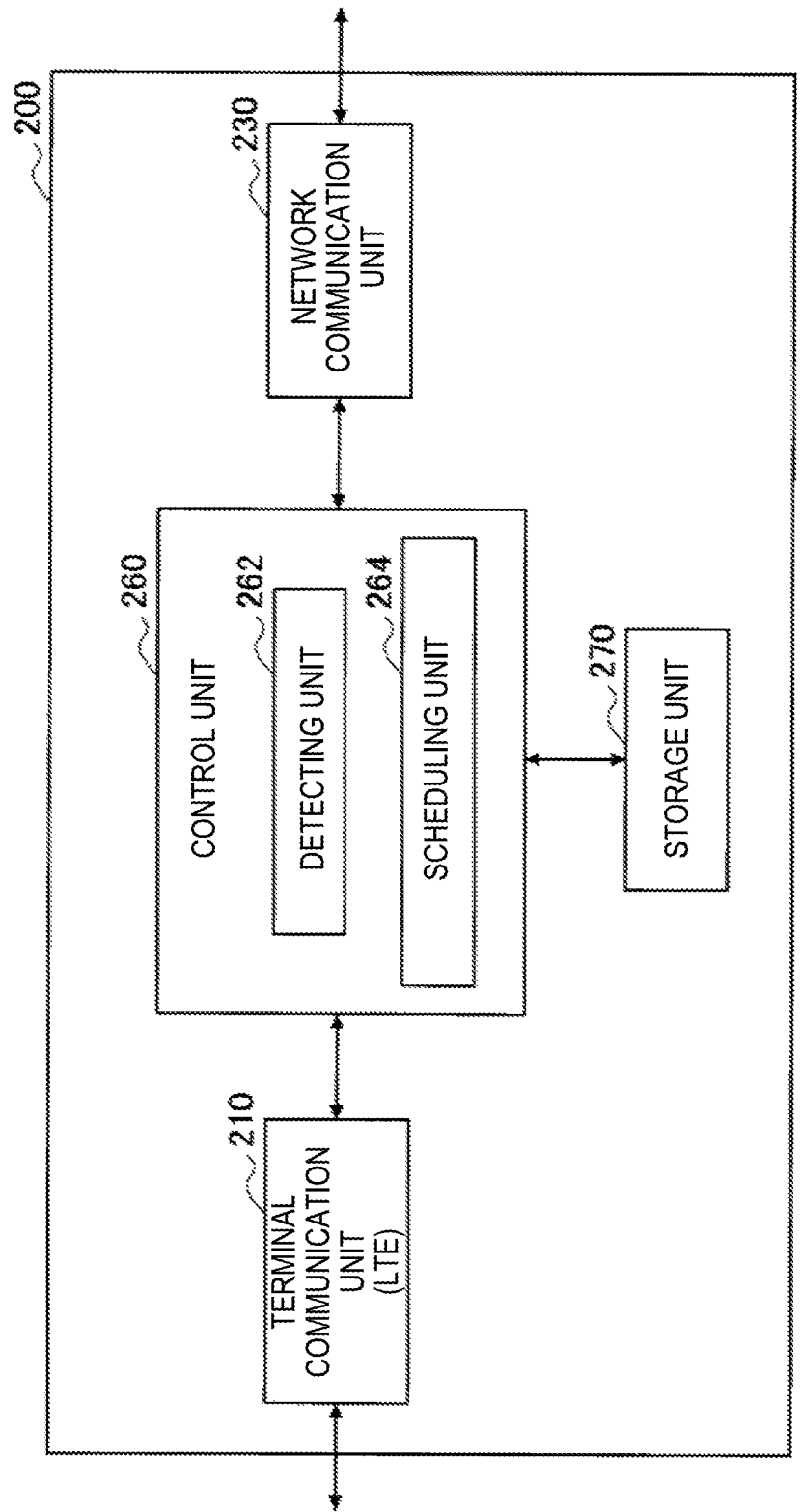
FIG. 8 is a block diagram showing an example of a configuration of a communication control apparatus according to the first embodiment.

In the first embodiment, the mechanism described above is realized by a terminal apparatus 100 having a configuration shown in FIG. 5 and a communication control apparatus 200 having a configuration shown in FIG. 8. The terminal apparatus 100 corresponds to the terminal apparatus UE1 shown in FIG. 1. The communication control apparatus 200 corresponds to the base station BS2 shown in FIG. 1.

[2-1. Example of Configuration of Terminal Apparatus]

FIG. 5 is a block diagram showing an example of the configuration of the terminal apparatus 100 according to the first embodiment. Referring to FIG. 5, the terminal apparatus 100 includes a first communication unit 110, a second communication unit 130, a detecting unit 150, a control unit 160, a storage unit 170, a voice processing unit 180, a microphone 182, a speaker 184, an input unit 186, and a display unit 188.

(1) First Communication Unit

The first communication unit 110 is a communication interface that performs communication according to a first wireless communication scheme using FDD. The communication that is performed by the first communication unit 110 is scheduled by an apparatus having a scheduling function. The first communication unit 110 transmits an uplink signal and receives a downlink signal, according to the scheduling result. Because the first wireless communication scheme uses the FDD as a duplex scheme, the transmission of the uplink signal and the reception of the downlink signal may be performed at the same time. In this embodiment, the first wireless communication scheme is an LTE scheme. The scheduling of the communication that is performed by the first communication unit 110 is performed by the communication control apparatus 200 that has a scheduling function of LTE and is described below.

In this embodiment, the first communication unit 110 generates a quality detection signal SIG1 and a transmission timing signal SIG2 that are used at the time of executing quality deterioration detection processing by the detecting unit 150 to be described below. The quality detection signal SIG1 is a signal that shows quality of a reception signal. The transmission timing signal SIG2 is a signal that shows transmission timing of a signal by the first communication unit 110.

Figure 6:
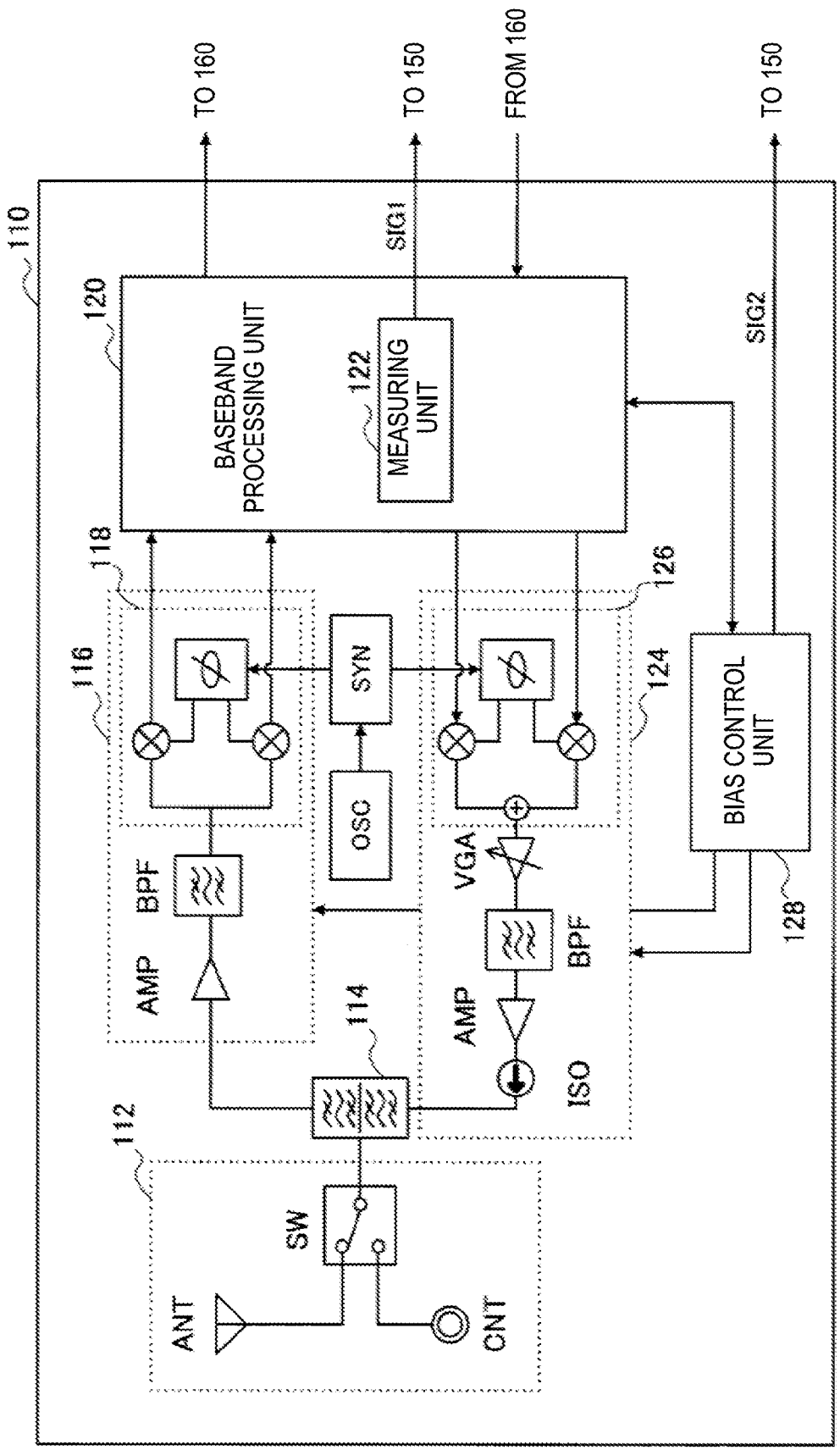
FIG. 6 is a block diagram showing an example of a detailed configuration of a first communication unit shown in FIG. 5.

FIG. 6 is a block diagram showing an example of a detailed configuration of the first communication unit 110 shown in FIG. 5. Referring to FIG. 6, the first communication unit 110 has an antenna section 112, a duplexer 114, a reception section 116, a baseband processing unit 120, a transmission section 124, and a bias control unit 128. The antenna section 112 includes a transmitting/receiving antenna (ANT), a connection terminal (CNT) for an external antenna, and an antenna switch (SW). The duplexer 114 separates a reception band of the reception section 116 and a transmission band of the transmission section 124. The reception section 116 includes a reception amplifier (AMP), a band-pass filter (BPF), and an orthogonal demodulator 118. The orthogonal demodulator 118 demodulates a reception signal with a reception frequency to be generated by a crystal oscillator (OSC) and adjusted by a frequency synthesizer (SYN). The baseband processing unit 120 performs decoding and error correction with respect to the reception signal demodulated in the reception section 116. The baseband processing unit 120 includes a measuring unit 122. The measuring unit 122 measures quality of the demodulated reception signal and generates a quality detection signal SIG1 that shows the measured quality. The measuring unit 122 outputs the generated quality detection signal SIG1 to the detecting unit 150. The transmission section 124 includes an orthogonal modulator 126, a variable gain amplifier (VGA), a band-pass filter (BPF), a transmission amplifier (AMP), and an isolator (ISO). The orthogonal modulator 126 modulates the transmission signal encoded by the baseband processing unit 120 with a transmission frequency generated by the crystal oscillator (OSC) and adjusted by the frequency synthesizer (SYN). The bias control unit 128 controls bias components that are supplied to the reception section 116 and the transmission section 124. The bias control unit 128 generates a transmission timing signal SIG2, based on a value of the bias component supplied to the transmission section 124. The bias control unit 128 outputs the generated transmission timing signal SIG2 to the detecting unit 150.

(2) Second Communication Unit

The second communication unit 130 is a communication interface that performs communication according to a second wireless communication scheme different from the first wireless communication scheme. In this embodiment, the second wireless communication scheme is a wireless LAN scheme. In the communication that is performed by the second communication unit 130, collision of signals is avoided by a carrier sense multiple access with collision avoidance (CSMA/CA) scheme. The transmission and the reception of the signal by the second communication unit 130 may be performed at the same time as the transmission of the uplink signal and the reception of the downlink signal by the first communication unit 110.

The second communication unit 130 may have the same configuration as a general wireless LAN interface. In this embodiment, the second communication unit 130 does not generate a quality detection signal SIG1 or a transmission timing signal SIG2.

(3) Detecting Unit

The detecting unit 150 detects deterioration of the reception quality of the first communication unit 110 due to generation of the communication by the first communication unit 110 and the communication by the second communication unit 130 at the same timing. In this embodiment, the detecting unit 150 detects the deterioration of the reception quality based on a correlation between the quality detection signal SIG1 showing the reception quality of the first communication unit 110 and the transmission timing signal SIG2 showing the transmission timing of the signal by the first communication unit 110.

Figure 7:
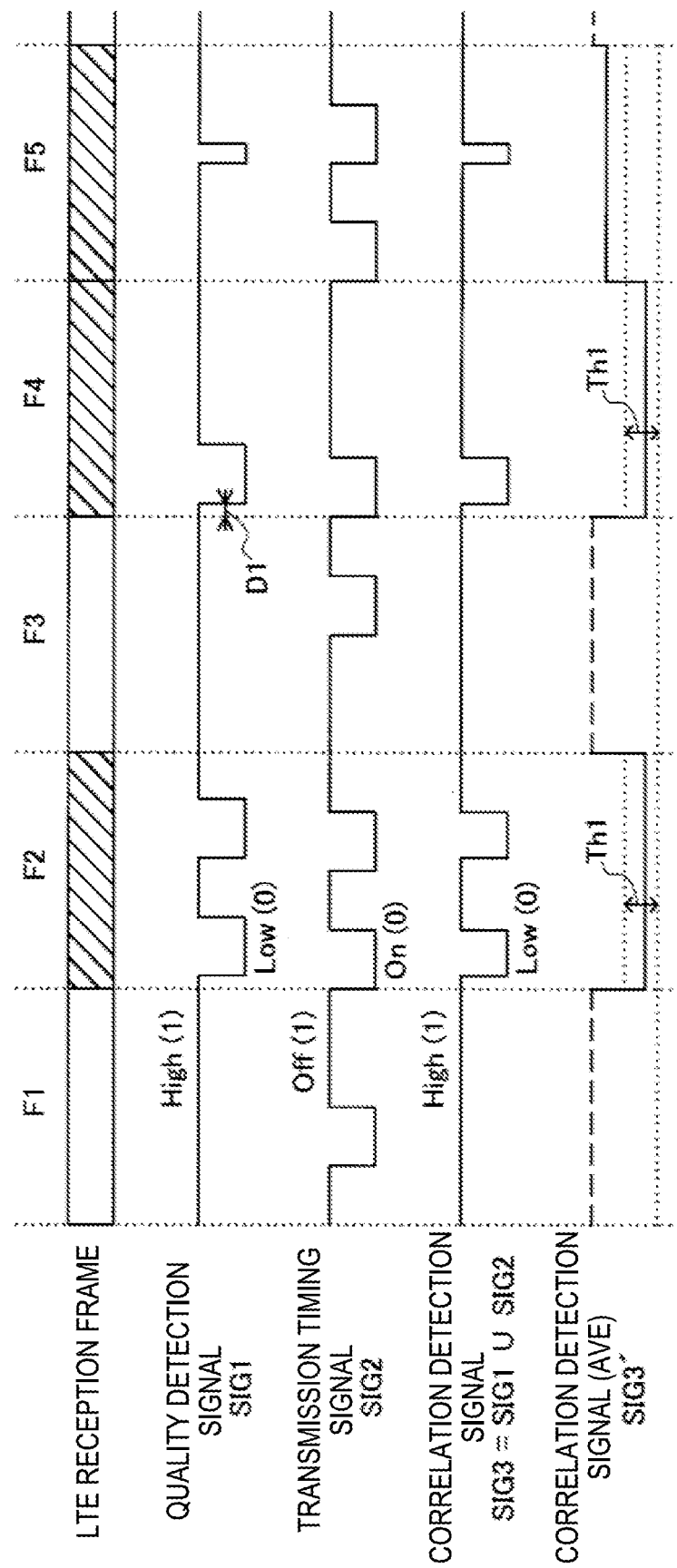
FIG. 7 is a diagram showing an example of quality deterioration detection processing by a detecting unit shown in FIG. 5.

FIG. 7 is a diagram showing an example of quality deterioration detection processing by the detecting unit 150. At an uppermost stage of FIG. 7, reception frames F1 to F5 of the LTE that are received in time series are shown. The hatched reception frames F2, F4, and F5 are reception frames that include resources in which the reception of the downlink signal by the first communication unit 110 is scheduled.

In the example of FIG. 7, the quality detection signal SIG1 is a signal that shows Low (0) in the case in which quality of a downlink signal is less than a predetermined threshold value when the downlink signal is received and shows High (1) in other cases. A general LTE terminal periodically measures channel quality and reports the measurement result to a base station according to a standard specification. In this case, the reported measurement result is called a channel quality indicator (CQI). The scheduling of the communication is performed based on the CQI. The CQI includes a signal to interference and noise power ratio (SINR). The measuring unit 122 of the first communication unit 110 may compare an SINR value with a predetermined threshold value and generate the quality detection signal SIG1 showing Low only when the SINR value is less than the threshold value. When a signal is received in a plurality of resources, the SINR value compared with the threshold value may be a minimum value, an average value or a median value among the plurality of resources. The transmission timing signal SIG2 is a signal that shows On (0) at the transmission timing of the uplink signal by the first communication unit 110 and shows Off (1) at the other timings.

The detecting unit 150 calculates a logical sum of the quality detection signal SIG1 and the transmission timing signal SIG2 shown in FIG. 7 and sets the calculation result as a correction detection signal SIG3. The correlation detection signal SIG3 is a signal that shows Low (0) in the case in which the quality detection signal SIG1 is Low (0) and the transmission timing signal SIG2 is On (0) and shows High (1) in the other cases. The detecting unit 150 calculates an average value SIG3' of a signal level of the correlation detection signal SIG3 per transmission of an uplink signal, for every constant period (for example, a period of one or a plurality of subframes). The average value SIG3' decreases when a correlation between the transmission of the uplink signal of the LTE and the deterioration of the reception quality of the downlink signal increases. Therefore, the detecting unit 150 can determine that the deterioration of the reception quality of the first communication unit 110 is generated due to generation of the transmission by the first communication unit 110 and the transmission by the second communication unit 130 at the same timing, when the average value SIG3' is less than the predetermined threshold value Th1. In the example of FIG. 7, in the reception frames F2 and F4, the average value SIG3' of the correlation detection signal SIG3 is less than the threshold value Th1.

When the transmission of the signal by the second communication unit 130 is not performed and only the transmission of the uplink signal and the reception of the downlink signal by the first communication unit 110 are performed at the same time, the excessive deterioration of the reception quality is not generated by an appropriate design of each apparatus, as described above. In this case, the average value SIG3' of the correlation detection signal SIG3 is not less than the threshold value Th1. Meanwhile, if the transmission of the signal by the second communication unit 130 is performed at the same time, the interference wave of the intermodulation described using FIGS. 3 and 4 is generated and the excessive deterioration of the reception quality is generated. In this case, the average value SIG3' of the correlation detection signal SIG3 is less than the threshold value Th1. For this reason, it can be assumed that the deterioration of the reception quality of the first communication unit 110 is generated due to the parallel communication of the first communication unit 110 and the second communication unit 130, even though only the transmission timing of the first communication unit 110 is monitored in addition to the reception quality of the first communication unit 110 and the transmission timing of the second communication unit 130 is not monitored, as described above. The present disclosure is not limited to the above example and the transmission timing of the second communication unit 130 may be monitored, instead of the transmission timing of the first communication unit 110.

Meanwhile, delay is generated until the measurement result of the reception quality is obtained by the measuring unit 122 after the reception quality is deteriorated in actuality. FIG. 7 shows the length D1 of the delay. In order to avoid the detection delay from deteriorating the precision of the correlation detection, the detecting unit 150 may add the delay to the transmission timing signal SIG2 and calculate a logical sum of the quality detection signal SIG1 and the transmission timing signal SIG2.

The detecting unit 150 detects the deterioration of the reception quality of the first communication unit 110 due to the parallel communication and outputs the detection result to the control unit 160.

(4) Control Unit

The control unit 160 controls an entire operation of the terminal apparatus 100 using a processor such as a central processing unit (CPU) or a digital signal processor (DSP). For example, the control unit 160 generates a data packet transmitted to another terminal apparatus through the base station of the LTE or the access point of the wireless LAN and processes a data packet received from another terminal apparatus.

In this embodiment, the control unit 160 includes a reporting unit 162 shown in FIG. 5. The reporting unit 162 reports the deterioration of the reception quality to the communication control apparatus 200 to be described below when the deterioration of the reception quality is detected by the detecting unit 150. The reporting unit 162 may transmit a quality report message to report the deterioration of the reception quality to the communication control apparatus 200 through the first communication unit 110. Instead, the reporting unit 162 may transmit the quality report message to the communication control apparatus 200 through the second communication unit 130. The quality report message that is transmitted through the second communication unit 130 can be transmitted to the communication control apparatus 200 through the Internet N2 (or another kind of network such as a wired LAN) shown in FIG. 1. The quality report message includes a message type to show that the corresponding message is the quality report message and a terminal ID to identify the terminal apparatus 100. If the communication control apparatus 200 receives the quality report message from the terminal apparatus 100, the communication control apparatus 200 schedules the reception of the downlink signal by the terminal apparatus 100 preferentially at a timing when the transmission of the uplink signal is not performed by the terminal apparatus 100, as described below.

(5) Other Structural Elements

The storage unit 170 stores programs and data to operate the terminal apparatus 100 using a storage medium such as a hard disk or a semiconductor memory. The voice processing unit 180 encodes a voice signal input through the microphone 182 to generate voice data having a digital format and outputs the generated voice data to the control unit 160. The voice processing unit 180 generates a voice signal having an analog format from the voice data input from the control unit 160 and outputs the generated voice signal to the speaker 184. The input unit 186 provides an input interface to cause a user to operate the terminal apparatus 100 or input information to the terminal apparatus 100. The display unit 188 may be a display to provide an image to the user of the terminal apparatus 100. The structural elements of the terminal apparatus 100 shown in FIG. 5 are only exemplary. That is, the terminal apparatus 100 may additionally include structural elements not shown in the drawings and some of the structural elements may be omitted from the configuration of the terminal apparatus 100.

[2-2. Example of Configuration of Communication Control Apparatus]

The communication control apparatus 200 is an apparatus that schedules the communication performed by the terminal apparatus 100 according to the LTE scheme. In this embodiment, an example in which the communication control apparatus 200 corresponds to the base station BS2 (for example, a femtocell base station) shown in FIG. 1 will be mainly described. However, the present disclosure is not limited to the above example and the communication control apparatus 200 may be another control node that has a scheduling function.

FIG. 8 is a block diagram showing an example of a configuration of the communication control apparatus 200 according to the first embodiment. Referring to FIG. 8, the communication control apparatus 200 includes a terminal communication unit 210, a network communication unit 230, a control unit 260, and a" storage unit 270.

(1) Terminal Communication Unit

The terminal communication unit 210 is a communication interface that performs communication according to the first wireless communication scheme using the FDD. In this embodiment, the first wireless communication scheme is the LTE scheme. The terminal communication unit 210 provides wireless communication services in the FDD mode to one or more terminal apparatuses (including the terminal apparatus 100) positioned in a cell around the communication control apparatus 200. The scheduling of the communication that is performed by the terminal communication unit 210 is performed by the scheduling unit 264 of the control unit 260 to be described below.

(2) Network Communication Unit

The network communication unit 230 is a communication interface that is connected to a network such as the Internet N2 shown in FIG. 1. The network communication unit 230 relays a communication packet included in an uplink signal from the terminal apparatus to be received by the terminal communication unit 210, to the core network N1. The network communication unit 230 receives the communication packet to be relayed to the terminal apparatus using the downlink signal by the terminal communication unit 210, from the core network N1.

(3) Control Unit

The control unit 260 controls an entire operation of the communication control apparatus 200 using a processor such as a CPU or a DSP. In this embodiment, the control unit 260 includes a detecting unit 262 and a scheduling unit 264.

The detecting unit 262 detects deterioration of the reception quality due to generation of the communication performed according to the LTE scheme and the communication performed according to another wireless communication scheme at the same timing. In this embodiment, another wireless communication scheme is the wireless LAN scheme. The detecting unit 262 detects the quality report message received from the terminal apparatus 100, among various messages received by the terminal communication unit 210 or the network communication unit 230. The terminal apparatus 100 is an apparatus that can perform communication according to both the LTE scheme and the wireless LAN scheme. The quality report message is a message that reports that the reception quality of the downlink signal received according to the LTE scheme is deteriorated due to parallel transmission of the uplink signal and the wireless LAN signal, in the terminal apparatus 100.

The scheduling unit 264 schedules the communication according to the LTE scheme performed by one or more terminal apparatuses through the terminal communication unit 210. When the detecting unit 262 detects the deterioration of the reception quality in the terminal apparatus 100, the scheduling unit 264 schedules the transmission of the downlink signal to the terminal apparatus 100 preferentially at a timing when the uplink signal is not transmitted from the terminal apparatus 100. The scheduling may be continuously performed until a predetermined period passes after the deterioration of the reception quality is detected. Hereinafter, an example of the scheduling by the scheduling unit 264 according to this embodiment will be described using FIGS. 9 and 10.

Figure 9:
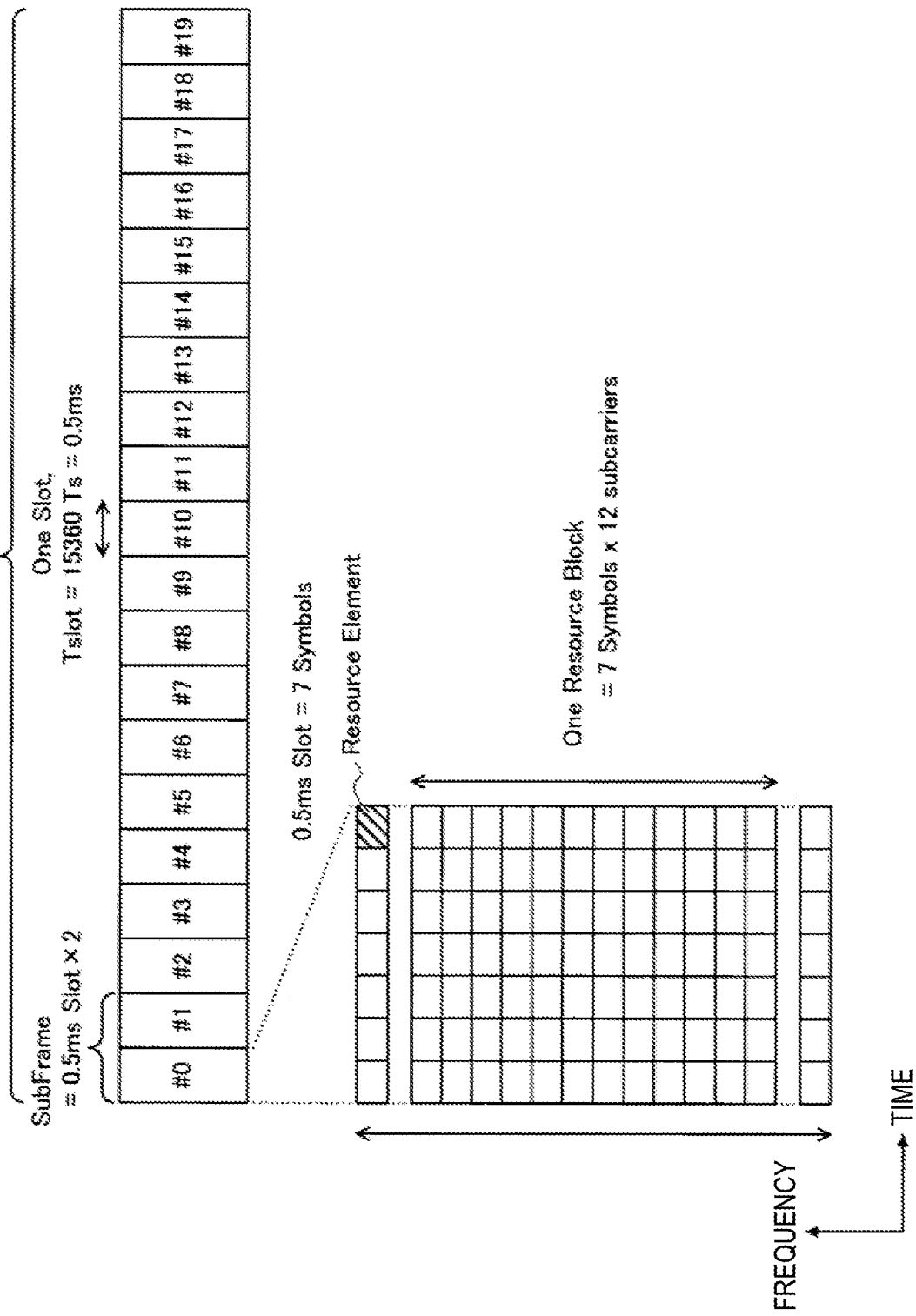
FIG. 9 is a diagram showing an example of a frame structure of LTE.

FIG. 9 is a diagram showing an example of a frame structure of the LTE. The frame structure of the LTE is common to the downlink resources and the uplink resources. The resources are divided into radio frames having the time length $T_r$ of 10 ms in a time domain. One radio frame includes ten subframes that have the length of 1 ms. One subframe includes two time slots (slots of 0.5 ms) that have the time length $T_{slot}$ of 0.5 ms. One slot of 0.5 ms has seven symbols in a time direction in general. In this case, the symbol means an orthogonal frequency division multiplexing (OFDM) symbol with respect to the downlink and a single carrier frequency division multiple access (SC-FDMA) symbol with respect to the uplink. One symbol and one subcarrier of a frequency direction form a resource element, which is a minimum unit of the resources. The scheduling of the resources is performed as a minimum unit that can allocate a resource block including one slot of 0.5 ms in a time direction and twelve subcarriers (a bandwidth is 180 kHz) in a frequency direction.

Figure 10:
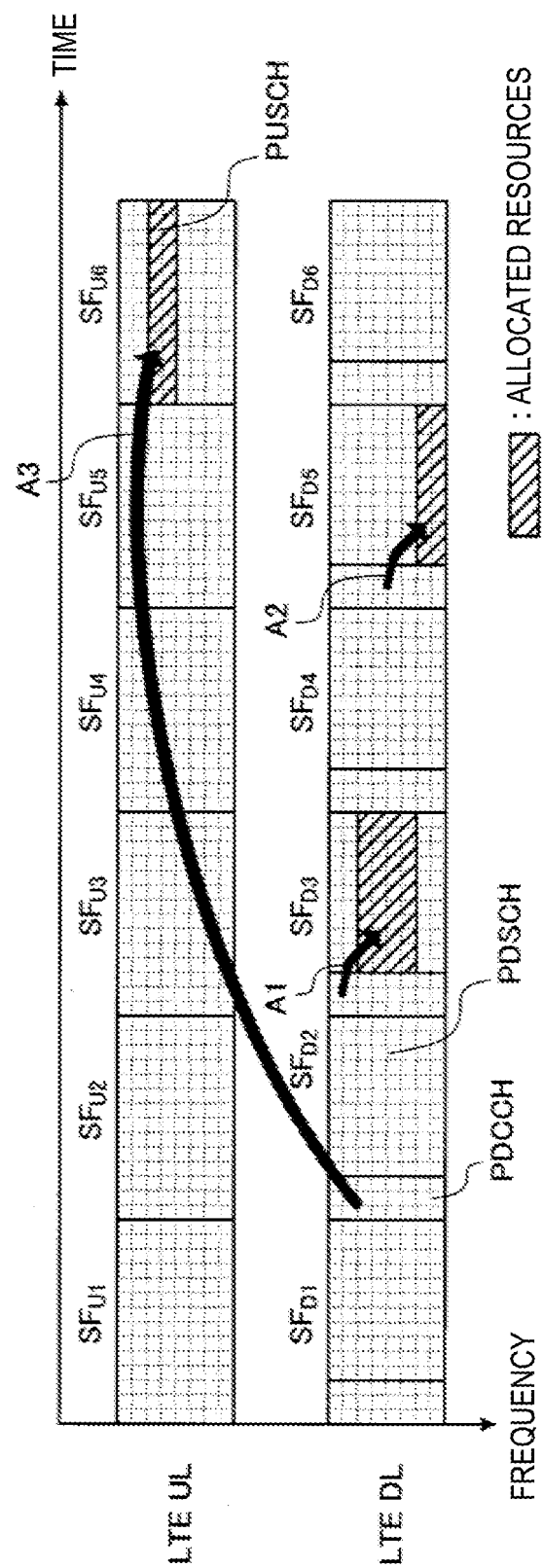
FIG. 10 is a diagram showing an example of scheduling processing by a scheduling unit shown in FIG. 8.

FIG. 10 is a diagram showing an example of scheduling processing by the scheduling unit 264. In FIG. 10, six subframes $SF_{U1}$ to $SF_{U6}$ of uplink resources are shown at an upper stage and $SF_{D1}$ to $SF_{D6}$ of downlink resources are shown at a lower stage. Three top symbols of each subframe of the downlink can be used for a physical downlink control channel (PDCCH). Scheduling information is distributed from the base station to the terminal apparatus on the PDCCH. The downlink signal is transmitted on a physical downlink shared channel (PDSCH) according to allocation of the resources shown by the scheduling information. The uplink signal is transmitted on a physical uplink shared channel (PUSCH). The resource allocation for the downlink signal is shown by the scheduling information distributed on the PDCCH in the same subframe as the allocated resources (refer to arrows A1 and A2 in the drawing). Meanwhile, the resource allocation for the uplink is shown by the scheduling information distributed on the PDCCH in the subframe preceding the subframe of the allocated resources by four (refer to arrow A3). The scheduling unit 264 determines the resource allocation based on a data amount of an allocation object, the CQI reported from one or more terminal apparatuses, and the scheduling request of the uplink.

In this embodiment, as described above, when the detecting unit 262 detects the deterioration of the reception quality in the terminal apparatus 100, the scheduling unit 264 schedules the transmission of the downlink signal to the terminal apparatus 100 preferentially at a timing when the uplink signal is not transmitted from the terminal apparatus 100. That is, if the quality report message received from the terminal apparatus 100 is detected by the detecting unit 262, the scheduling unit 264 identifies the terminal apparatus 100 from the terminal ID included in the corresponding message. If downlink data to be transmitted to the identified terminal apparatus 100 is generated, the scheduling unit 264 specifies a resource block of the corresponding PDSCH at a timing when the uplink transmission from the terminal apparatus 100 is not scheduled and allocates the downlink transmission with respect to the terminal apparatus 100 to the specified resource block.

By the scheduling described above, performing the reception of the downlink signal of the LTE, the transmission of the uplink signal, and the transmission of the wireless LAN signal in the terminal apparatus 100 at the same time is avoided. The suppressing of the parallel communication is continued during at least a constant period. The length of the period may be fixed previously or may be set by the user of the terminal apparatus 100 and reported to the scheduling unit 264 using the quality report message. When the use of the wireless LAN ends in the terminal apparatus 100 after the constant period passes, the reception quality of the downlink signal can be maintained at the desired quality, even when the suppressing of the parallel communication is released. Meanwhile, when the use of the wireless LAN does not end and the reception quality of the downlink signal is deteriorated again, the quality report message is transmitted from the terminal apparatus 100 again. The scheduling unit 264 may continuously execute the suppressing of the parallel communication, until a message requesting that the suppressing of the parallel communication be released is received from the terminal apparatus 100.

(4) Other Structural Elements

The storage unit 270 stores programs and data to operate the communication control apparatus 200, using storage media such as a hard disk or a semiconductor memory. For example, when it is necessary to defer the downlink transmission until the uplink transmission from the terminal apparatus 100 ends after the downlink data to be transmitted to the terminal apparatus 100 is generated, the downlink data is buffered temporarily in the storage unit 270.

[2-3. Modification]

Even when the wireless communication system has the scheduling mechanism, if the usable resources are few, the reception of the downlink signal by the terminal apparatus 100 may be allocated at the same timing as the transmission of the uplink signal by the terminal apparatus 100. Even when the transmission of the quality report message fails due to an error, the reception of the downlink signal by the terminal apparatus 100 may be allocated at the same timing as the transmission of the uplink signal by the terminal apparatus 100. The base station that provides the services to the terminal apparatus 100 may not support a function of suppressing the parallel communication. Therefore, when the transmission and the reception by the first communication unit 110 are scheduled at the same timing after the deterioration of the reception quality is detected by the detecting unit 150, the first communication unit 110 of the terminal apparatus 100 may not transmit the uplink signal at the corresponding timing. For example, the first communication unit 110 may request the communication control apparatus 200 to perform the scheduling to transmit the uplink signal again, after temporarily deferring the transmission of the uplink signal and normally receiving only the downlink signal. Thereby, the deterioration of the reception quality of the downlink signal in the terminal apparatus 100 can be reliably avoided.

[2-4: Example of Flow of Processing]

Figure 11:
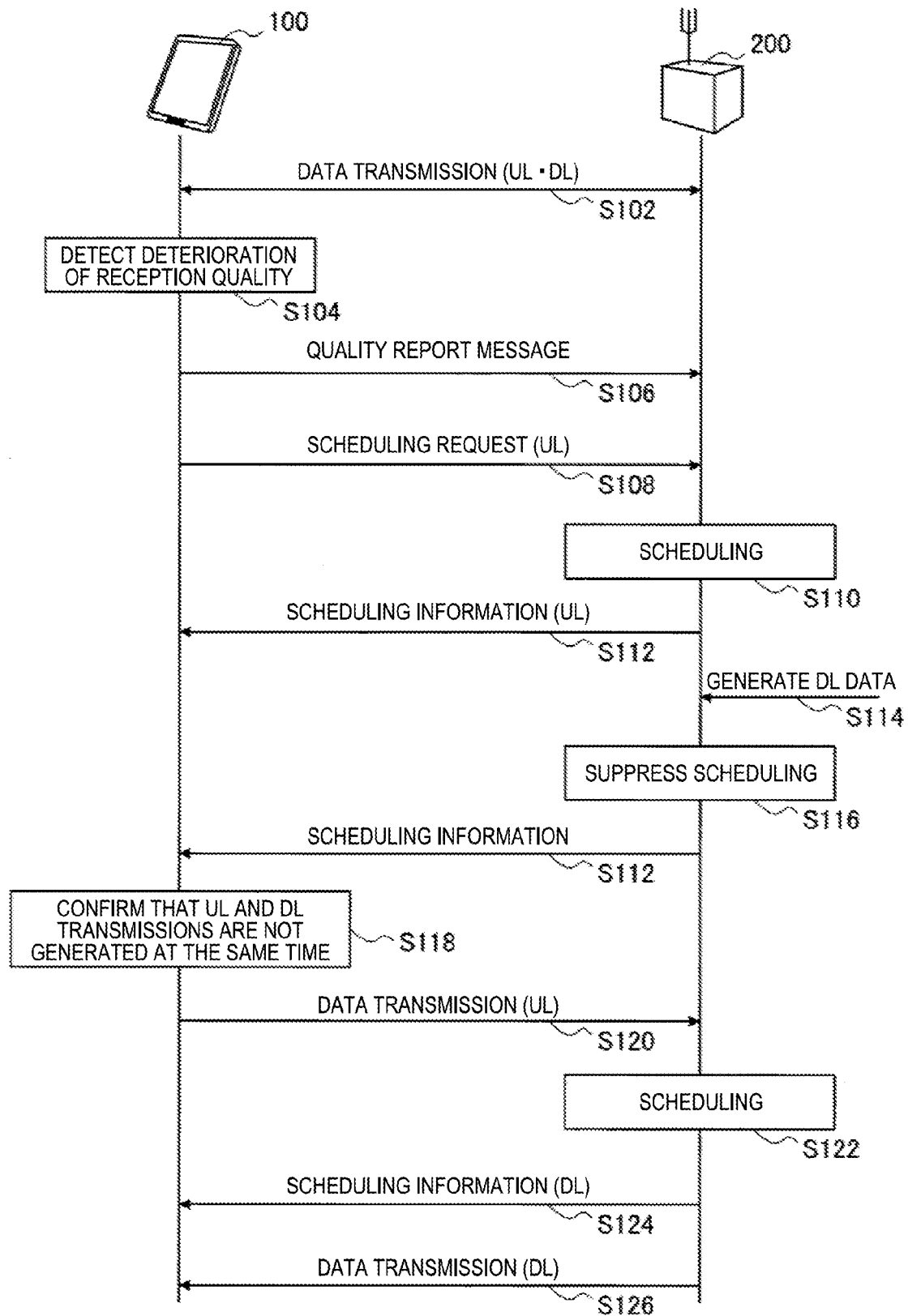
FIG. 11 is a sequence diagram showing an example of a flow of communication control processing according to the first embodiment.

FIG. 11 is a sequence diagram showing an example of a flow of communication control processing between the terminal apparatus 100 and the communication control apparatus 200 according to this embodiment.

In FIG. 11, first, the uplink transmission and the downlink transmission are performed at the same time, between the first communication unit 110 of the terminal apparatus 100 and the terminal communication unit 210 of the communication control apparatus 200 (step S102). The detecting unit 150 of the terminal apparatus 100 monitors the reception quality of the downlink signal and the transmission timing of the uplink signal by the first communication unit 110 and detects the deterioration of the reception quality of the downlink signal due to the parallel communication of the first communication unit 110 and the second communication unit 130 (step S104). If the deterioration of the reception quality is detected by the detecting unit 150, the reporting unit 162 of the terminal apparatus 100 generates a quality report message to report the deterioration of the reception quality to the communication control apparatus 200 and transmits the generated quality report message to the communication control apparatus 200 (step S106).

Next, if the uplink data to be transmitted is generated, the first communication unit 110 of the terminal apparatus 100 requests the scheduling (permission of the uplink signal) from the communication control apparatus 200 (step S108). The scheduling unit 264 of the communication control apparatus 200 allocates any application resources to the terminal apparatus 100 according to the scheduling request (step S110). The scheduling unit 264 distributes scheduling information showing the resource allocation to the terminal apparatus 100 on the PDCCH (step S112).

In the communication control apparatus 200, the downlink data to be transmitted to the terminal apparatus 100 is generated (step S114). When the uplink resources of the same timing as the timing of the downlink resources of the scheduling object are already allocated to the terminal apparatus 100, the scheduling unit 264 does not allocate the transmission of the downlink data to be transmitted to the terminal apparatus 100 to the downlink resources (step S116). The scheduling information that shows the scheduling result is distributed to the terminal apparatus 100 on the PDCCH (step S112).

The first communication unit 110 of the terminal apparatus 100 confirms tht the downlink resources of the same timing as the timing of the uplink resources shown by the scheduling information received in step S112 are not allocated to the self apparatus (step S118). The first communication unit 110 transmits the uplink signal using the allocated uplink resources (step S120).

Next, the transmission of the downlink data to be transmitted to the terminal apparatus 100 is scheduled by the scheduling unit 264 of the communication control apparatus 200 (step S122). The scheduling unit 264 distributes the scheduling information showing the resource allocation to the terminal apparatus 100 on the PDCCH (step S124). The first communication unit 110 of the terminal apparatus 100 receives the downlink signal transmitted from the communication control apparatus 200, according to the received scheduling information (step S126). The scheduling and the downlink transmission with respect to the downlink data generated in step S114 may be performed before the transmission of the uplink signal in step S120.

2-5. Summary of First Embodiment

According to this embodiment, the deterioration of the reception quality due to the parallel communication in the terminal apparatus 100 that can perform communication according to the first wireless communication scheme using the FDD and the second wireless communication scheme is reported to the communication control apparatus 200 that schedules the communication according to the first wireless communication scheme. The communication control apparatus 200 adjusts the scheduling not to deteriorate the reception quality in the terminal apparatus 100, according to the report. Thereby, the reception of the downlink signal by the terminal apparatus 100 is scheduled preferentially at the timing different from the timing of the transmission of the uplink signal by the terminal apparatus 100. As a result, even when the transmission of the uplink signal according to the first wireless communication scheme and the transmission of the signal according to the second wireless communication scheme are performed in parallel by the terminal apparatus 100, the noise or the interference wave generated due to the parallel transmission deteriorating the reception quality of the downlink signal according to the first wireless communication scheme is avoided.

According to this embodiment, the terminal apparatus 100 detects the deterioration of the reception quality due to the parallel communication based on the correlation between the signal showing the reception quality of the downlink signal in the first communication unit 110 and the signal showing the transmission timing of the uplink signal. Therefore, the mechanism suggested in this embodiment can be introduced at a relatively small cost without altering the communication interface for the wireless LAN in the communication interface for the LTE and the communication interface for the wireless LAN.

The terminal apparatus 100 can use the channel quality indicator reported periodically to the base station in the wireless communication scheme such as the LTE scheme to determine the reception quality of the downlink signal. In this case, because it is not necessary to additionally mount a function of measuring the reception quality of the downlink signal, the introduction of the mechanism that is suggested in this embodiment becomes easy.

3. Second Embodiment

Figure 12:
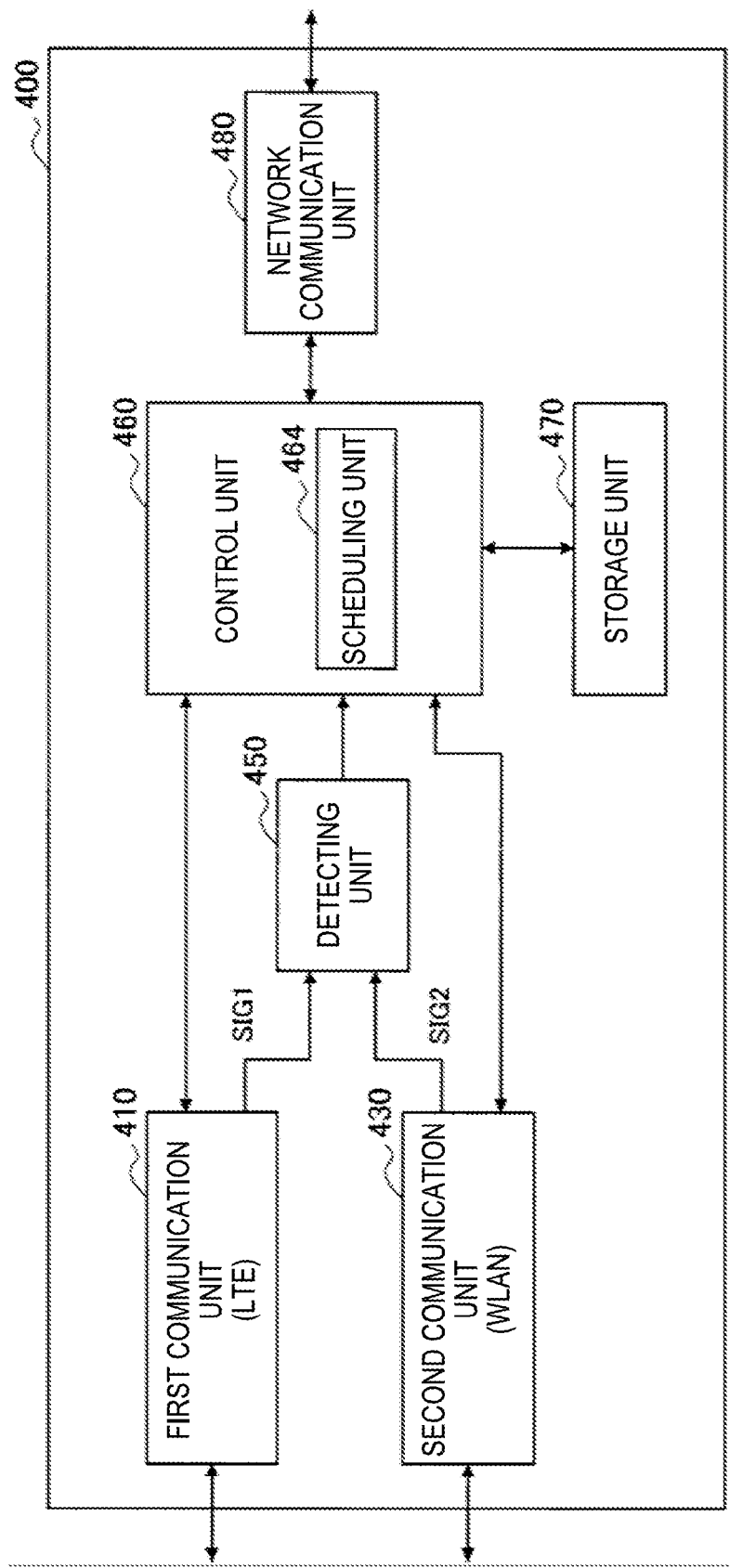
FIG. 12 is a block diagram showing an example of a configuration of a communication control apparatus according to a second embodiment.

In the second embodiment, a mechanism for suppressing the parallel communication is realized by a terminal apparatus 300, which is a general cellular communication terminal, and a communication control apparatus 400 having a configuration shown in FIG. 12. The terminal apparatus 300 corresponds to the terminal apparatus UE2 shown in FIG. 1. The communication control apparatus 400 corresponds to the base station BS3 shown in FIG. 1.

[3-1. Example of Configuration of Communication Control Apparatus]

The communication control apparatus 400 is an apparatus that schedules communication according to the LTE scheme. The communication control apparatus 400 supports a wireless LAN connection function for the terminal apparatus.

FIG. 12 is a block diagram showing an example of the configuration of the communication control apparatus 400 according to the second embodiment. Referring to FIG. 12, the communication control apparatus 400 includes a first communication unit 410, a second communication unit 430, a detecting unit 450, a control unit 460, a storage unit 470, and a network communication unit 480.

(1) First Communication Unit

The first communication unit 410 is a communication interface that performs communication according to a first wireless communication scheme using FDD. In this embodiment, the first wireless communication scheme is an LTE scheme. The first communication unit 410 provides wireless communication services in an FDD mode to one or more terminal apparatuses (including the terminal apparatus 300) positioned in a cell around the communication control apparatus 400. Scheduling of the communication by the first communication unit 410 is performed by the scheduling unit 464 of the control unit 460 to be described below.

In this embodiment, the first communication unit 410 generates a quality detection signal SIG1 that is used at the time of executing quality deterioration detection processing by the detecting unit 450 to be described below. The quality detection signal SIG1 is a signal that shows quality of a reception signal. For example, the first communication unit 410 may have the same configuration as the first communication unit 110 of the terminal apparatus 100 shown in FIG. 6. The first communication unit 410 measures a quality level of the uplink signal received from the terminal apparatus in a baseband processing unit and generates a quality detection signal SIG1.

(2) Second Communication Unit

The second communication unit 430 is a communication interface that performs communication according to a second wireless communication scheme different from the first wireless communication scheme. In this embodiment, the second wireless communication scheme is a wireless LAN scheme. In the communication that is performed by the second communication unit 430, collision of signals is avoided by a CSMAJCA scheme. The transmission and the reception of the signal by the second communication unit 430 may be performed at the same time as the reception of the uplink signal and the transmission of the downlink signal by the first communication unit 410.

In this embodiment, the second communication unit 430 generates a transmission timing signal SIG2 that is used at the time of executing quality deterioration detection processing by the detecting unit 450 to be described below. The transmission timing signal SIG2 is a signal that shows transmission timing of a signal by the second communication unit 430.

Figure 13:
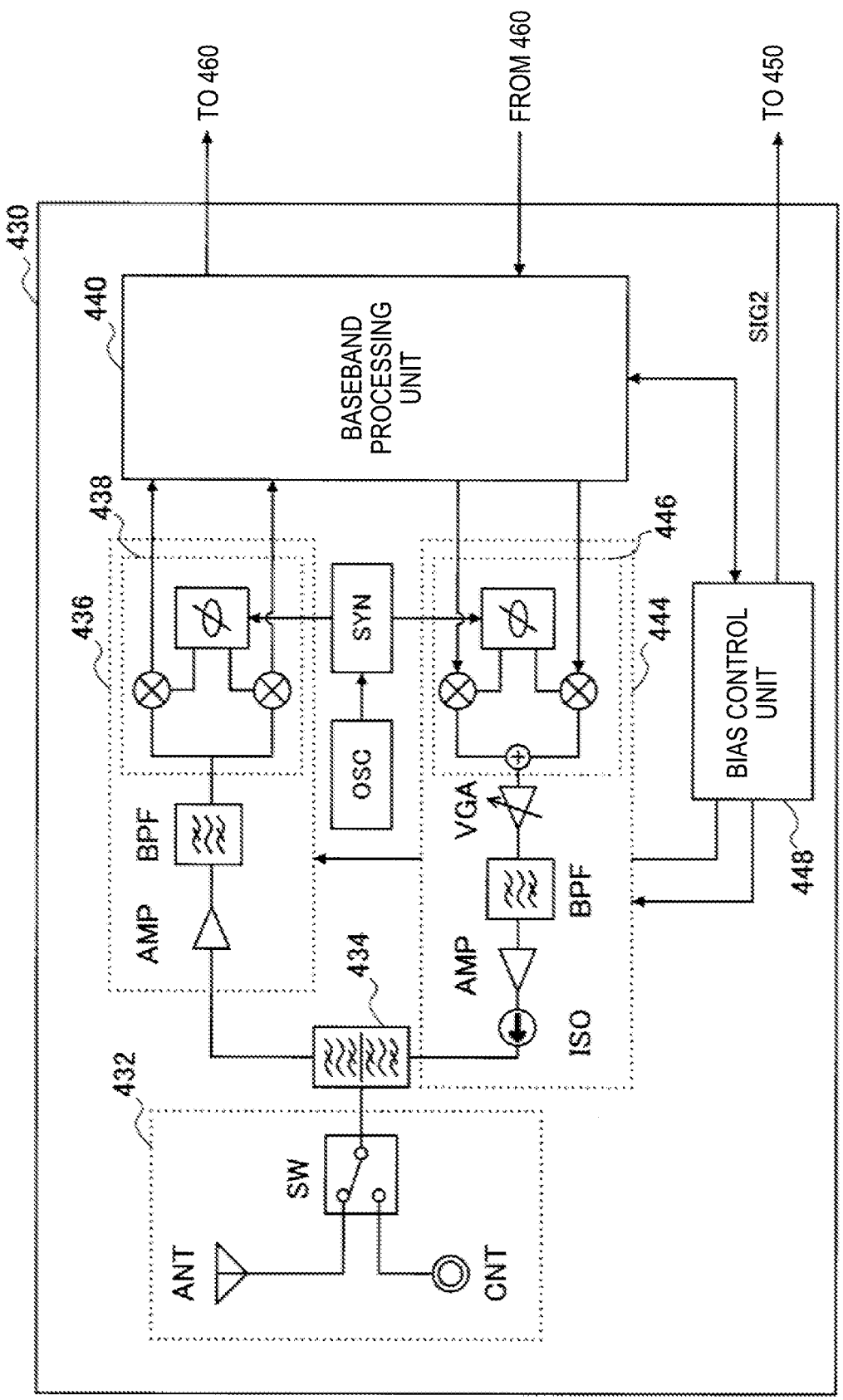
FIG. 13 is a block diagram showing an example of a detailed configuration of a second communication unit shown in FIG. 12.

FIG. 13 is a block diagram showing an example of a detailed configuration of the second communication unit 430 shown in FIG. 12. Referring to FIG. 13, the second communication unit 430 has an antenna section 432, a duplexer 434, a reception section 436, a baseband processing unit 440, a transmission section 444, and a bias control unit 448. The antenna section 432 includes a transmitting/receiving antenna (ANT), a connection terminal (CNT) for an external antenna, and an antenna switch (SW). The duplexer 434 separates a reception band of the reception section 436 and a transmission band of the transmission section 444. The reception section 436 includes a reception amplifier (AMP), a band-pass filter (BPF), and an orthogonal demodulator 438. The orthogonal demodulator 438 demodulates a reception signal with a reception frequency to be generated by a crystal oscillator (OSC) and adjusted by a frequency synthesizer (SYN). The baseband processing unit 440 performs decoding and error correction with respect to the reception signal demodulated in the reception section 436. The transmission section 444 includes an orthogonal modulator 446, a variable gain amplifier (VGA), a band-pass filter (BPF), a transmission amplifier (AMP), and an isolator (ISO). The orthogonal modulator 446 modulates the transmission signal encoded by the baseband signal processing unit 440 with a transmission frequency generated by the crystal oscillator (OSC) and adjusted by the frequency synthesizer (SYN). The bias control unit 448 controls bias components that are supplied to the reception section 436 and the transmission section 444. The bias control unit 448 generates a transmission timing signal SIG2 based on a value of the bias component supplied to the transmission section 444. The bias control unit 448 outputs the generated transmission timing signal SIG2 to the detecting unit 450.

(3) Detecting Unit

The detecting unit 450 detects deterioration of the reception quality of the first communication unit 410 due to generation of the communication by the first communication unit 410 and the communication by the second communication unit 430 at the same timing. In this embodiment, the detecting unit 450 detects the deterioration of the reception quality based on a correlation between the quality detection signal SIG1 showing the reception quality of the first communication unit 410 and the transmission timing signal SIG2 showing the transmission timing of the signal by the second communication unit 430.

The detecting unit 450 may detect the deterioration of the reception quality, similar to the quality deterioration detection processing by the detecting unit 150 of the terminal apparatus 100 according to the first embodiment described using FIG. 7. Specifically, the quality detection signal SIG1 is a signal that shows Low (0) in the case in which quality of an uplink signal is less than a predetermined threshold value when the uplink signal is received and shows High (1) in other cases. The transmission timing signal SIG2 is a signal that shows On (0) at the transmission timing of the wireless LAN signal by the second communication unit 430 and shows Off (1) at other timings. The detecting unit 450 calculates a logical sum of the quality detection signal SIG1 and the transmission timing signal SIG2 and sets the calculation result as a correction detection signal SIG3. The detecting unit 450 calculates an average value SIG3' of a signal level of the correlation detection signal SIG3 per transmission of a wireless LAN signal, for every constant period (for example, a period of one or a plurality of subframes). In addition, the detecting unit 450 can determine that the deterioration of the reception quality of the first communication unit 410 is generated due to generation of the transmission by the first communication unit 410 and the transmission by the second communication unit 430 at the same timing, when the average value SIG3' is less than the predetermined threshold value. The detecting unit 450 may add the delay to the transmission timing signal SIG2 and calculate a logical sum of the quality detection signal SIG1 and the transmission timing signal SIG2 to prevent the detection delay with respect to the reception quality from deteriorating the precision of the correlation detection.

The detecting unit 450 detects the deterioration of the reception quality of the first communication unit 410 due to the parallel communication and outputs the detection result to the control unit 460.

(4) Control Unit

The control unit 460 controls an entire operation of the terminal apparatus 400 using a processor such as a central processing unit (CPU) or a digital signal processor (DSP). In this embodiment, the control unit 460 includes a scheduling unit 464.

The scheduling unit 464 schedules communication according to the LTE scheme performed by one or more terminal apparatuses through the first communication unit 410. When the deterioration of the reception quality is detected by the detecting unit 450, the scheduling unit 464 schedules the reception of the uplink signal by the first communication unit 410 preferentially at a timing when a signal is not transmitted by the second communication unit 430. The scheduling may be continuously performed until a predetermined period passes after the deterioration of the reception quality is detected. Hereinafter, an example of the scheduling by the scheduling unit 464 according to this embodiment will be described using FIG. 14.

Figure 14:
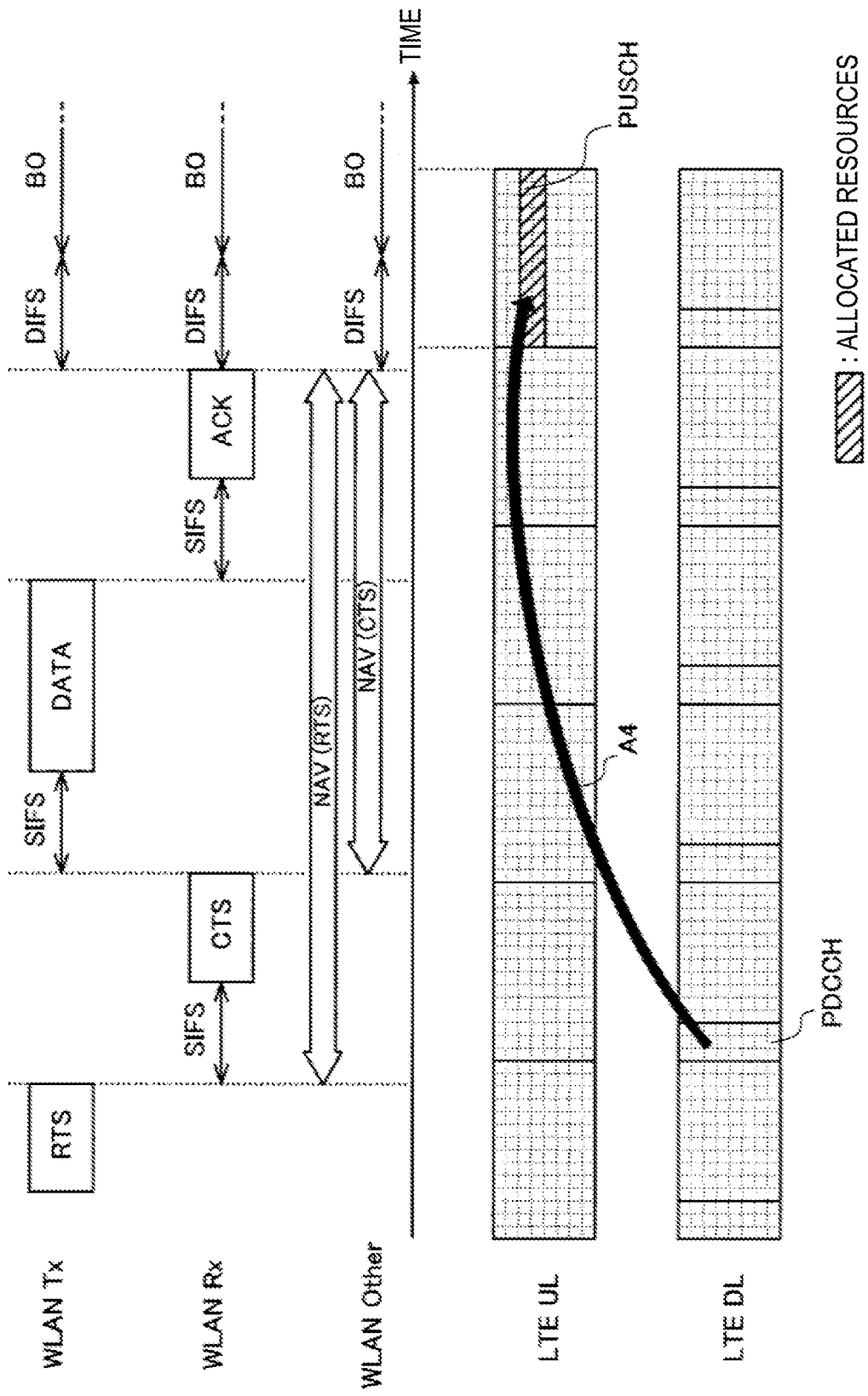
FIG. 14 is a diagram showing an example of transmission timing of a wireless LAN.

FIG. 14 shows an example of transmission timing of a wireless LAN. A transmission station (WLAN Tx) that transmits a data frame of the wireless LAN first transmits a request to send (RTS) frame. In the RTS, a network allocation vector (NAV) that shows a time in units of microseconds until an acknowledgement (ACK) with respect to a transmission scheduled data frame ends is described. All of the other apparatuses that are not concerned with a data exchange count down the NAV described in the RTS until the NAV becomes 0 and determine that radio resources are busy during a period until the countdown ends. A reception station (WLAN Rx) that is a communication partner of the transmission station transmitting the RTS transmits a clear to send (CTS) frame when a period defined by a short inter-frame space (SIFS) passes from the reception of the RTS. In the CTS, a NAV that shows a time until an ACK with respect to a reception scheduled data frame ends (that is smaller than the NAV of the RTS) is described. All of the other apparatuses that are not concerned with a data exchange count down the NAV described in the CTS until the NAV becomes 0 and determine that radio resources are busy during a period until the countdown ends. If the exchange of the RTS and the CTS is completed between the transmission station and the reception station, a data frame (DATA) is transmitted from the transmission station to the reception station and the ACK is returned from the reception station to the transmission station. At this time, because the other apparatuses determining that the radio resources are busy do not transmit signals, the signals that are exchanged between the transmission station and the reception station avoid colliding with other signals. If a period defined by a distributed inter-frame space (DIFS) passes from the reception of the ACK, the other apparatuses can try to access the radio resources again. After the DIFS, a back-off (BO) window period that includes a plurality of slots is continued. The length of the back off window is randomly selected by every apparatus attempting access. The next access privileges to the radio resources are given to the apparatus that selects the shortest back-off window. For example, according to the 802.11b standard specification, the length of the back-off window is selected in a range of 0.62 to 20.46 ms.

In this embodiment, the scheduling unit 464 predicts the following transmission timings of signals by the second communication unit 430 based on a buffering state of the transmission data, the carrier sensing result, and a passage time from the previous signal transmission or reception by referring to the setting of the SIFS, the DIFS, the NAV, and the length of the back-off window in the second communication unit 430. If the uplink scheduling request is received from the terminal apparatus connected to the self apparatus after the deterioration of the reception quality is detected by the detecting unit 450, the scheduling unit 464 preferentially allocates the uplink transmission by the terminal apparatus to a resource block of the PUSCH not overlapping the predicted transmission timing of the wireless LAN signal (for example, refer to an arrow A4 of FIG. 14).

By the scheduling described above, performing the reception of the uplink signal of the LTE, the transmission of the downlink signal, and the transmission of the wireless LAN signal in the communication control apparatus 400 at the same time is avoided. The suppressing of the parallel communication is continued during at least a constant period.

(5) Other Structural Elements

The storage unit 470 stores programs and data to operate the communication control apparatus 400, using a storage medium such as a hard disk or a semiconductor memory. The network communication unit 480 is a communication interface that is connected to the network such as the Internet N2 shown in FIG. 1.

[3-2. Example of Flow of Processing]

Figure 15:
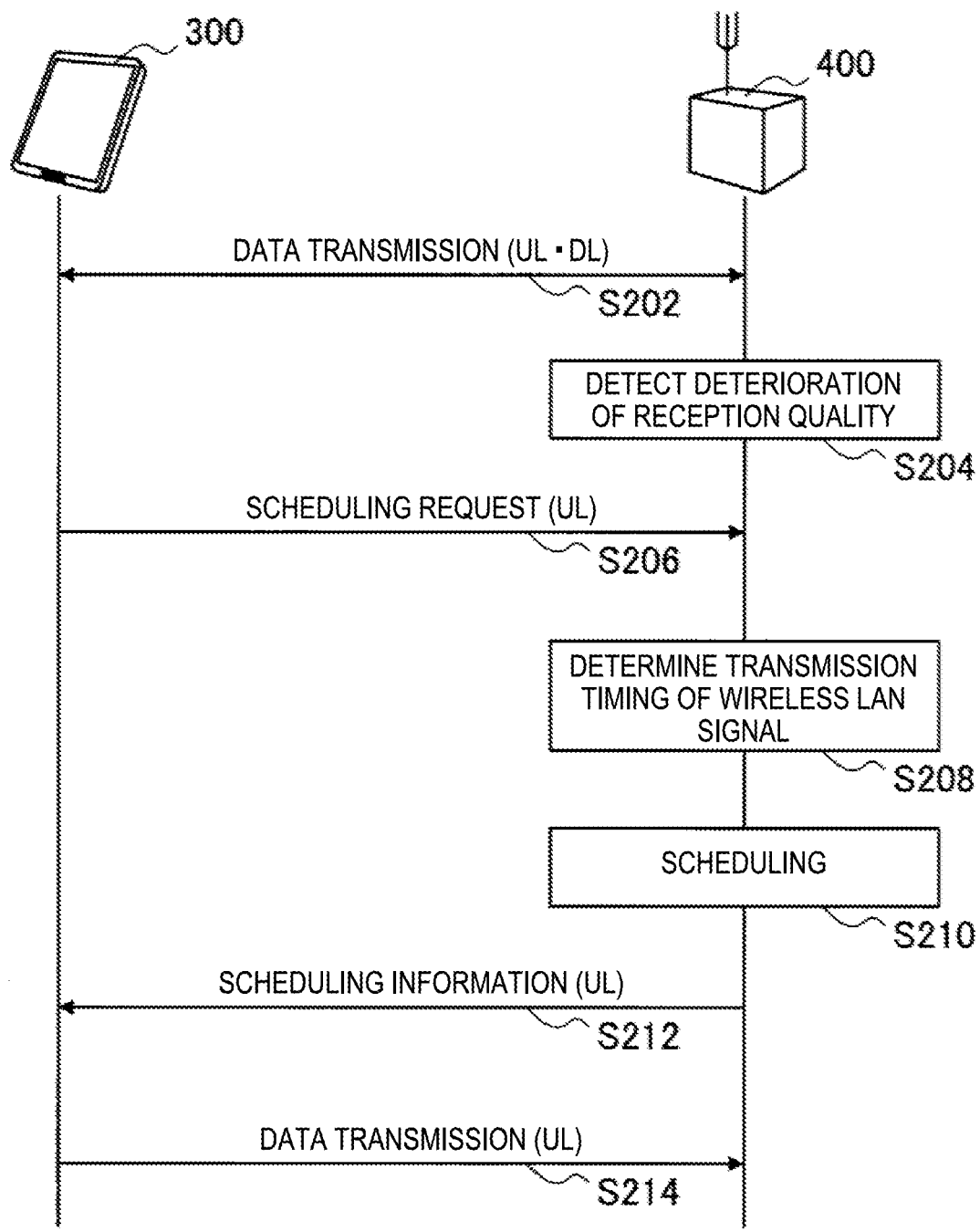
FIG. 15 is a sequence diagram showing an example of a flow of communication control processing according to the second embodiment.

FIG. 15 is a sequence diagram showing an example of a flow of communication control processing between the terminal apparatus 300 and the communication control apparatus 400 according to this embodiment.

In FIG. 15, first, the uplink transmission and the downlink transmission are performed at the same time, between the terminal apparatus 300 and the first communication unit 410 of the communication control apparatus 400 (step S202). The detecting unit 450 of the communication control apparatus 400 monitors the reception quality of the uplink signal and the transmission timing of the wireless LAN signal by the first communication unit 410 and detects the deterioration of the reception quality of the uplink signal due to the parallel communication of the first communication unit 410 and the second communication unit 430 (step S204).

Next, if the uplink data to be transmitted is generated, the terminal apparatus 300 requests the scheduling (permission of the uplink signal) from the communication control apparatus 400 (step S206). The scheduling unit 464 of the communication control apparatus 400 determines the following transmission timings of wireless LAN signals by the second communication unit 430 according to the scheduling request (step S208). The scheduling unit 464 allocates the uplink resources to the terminal apparatus 300 at a timing when the wireless LAN signal is not transmitted (step S210). The scheduling unit 464 distributes scheduling information showing the resource allocation to the terminal apparatus 300 on the PDCCH (step S212).

The terminal apparatus 300 transmits an uplink signal using the allocated uplink resources shown by the scheduling information received in step S212 (step S214).

[3-3. Summary of Second Embodiment]

According to this embodiment, if the deterioration of the reception quality due to the parallel communication is detected in the communication control apparatus 400 that can perform communication according to the first wireless communication scheme using the FDD and the second wireless communication scheme, the following scheduling is adjusted not to deteriorate the reception quality. As a result, because the reception of the uplink signal according to the first wireless communication scheme and the transmission of the signal according to the second wireless communication scheme are not performed in parallel from the terminal apparatus, the deterioration of the reception quality of uplink signal due to the parallel communication is avoided.

<4. Generalization>

The two embodiments of the present disclosure have been described in detail using FIGS. 1 to 15. According to the embodiments, in the case in which the communication interfaces operating according to the different wireless communication schemes are included in the same casing, when at least one wireless communication scheme is operated in the FDD mode, the deterioration of the reception quality of the signal due to the parallel communication can be prevented. This effect can be achieved by suppressing the parallel communication. Therefore, in the embodiments, because it is not necessary to increase the distance between the antennas of the plurality of communication interfaces, the size of the apparatus can be decreased. Because a special design of the circuit element such as the filter and the amplifier is not necessary, the number of components of the apparatus can be decreased and the apparatus can be manufactured at a low cost. Because the parallel communication is suppressed, in principle, the interference wave that is generated due to the intermodulation in one casing does not overlap the reception signal. Therefore, because it is not necessary to increase the transmission power to achieve the desired reception quality, in an area in which only maximum transmission power that is relatively low can be used, the apparatus such as the femtocell base station or the mobile router can be used. The mechanism that is suggested in the embodiments described above does not limit the selection of the frequency channel.

The series of processes by each apparatus described in the present disclosure can be executed by using any one of software, hardware, and a combination of the software and the hardware. The programs that form the software are stored previously in storage media provided inside or outside each apparatus. Each program is read in a RAM and is executed by a processor when each program is executed.

The preferred embodiments of the present disclosure have been described in detail with reference to the appended drawings. However, a technical range of the present disclosure is not limited to the above examples. It will be apparent to those skilled in the art that various modifications and changes can be made without departing from the technical scope defined by the appended claims. Therefore, it should be understood that the various modifications and changes are included in the technical range of the present disclosure.

Additionally, the present technology may also be configured as below.

(1) A terminal apparatus comprising:
a first communication unit that performs communication according to a first wireless communication scheme using frequency division duplex;
a second communication unit that performs communication according to a second wireless communication scheme different from the first wireless communication scheme;
a detecting unit that detects deterioration of reception quality of the first communication unit due to generation of the communication by the first communication unit and the communication by the second communication unit at the same timing; and
a reporting unit that reports the deterioration of the reception quality to a communication control apparatus scheduling the communication by the first communication unit, when the deterioration of the reception quality is detected by the detecting unit.

(2) The terminal apparatus according to (1),
wherein the detecting unit detects the deterioration of the reception quality, based on a correlation between a signal showing the reception quality and a signal showing transmission timing of a signal by the first communication unit or the second communication unit.

(3) The terminal apparatus according to (2),
wherein the detecting unit determines the reception quality using a channel quality indicator measured for a report to the communication control apparatus.

(4) The terminal apparatus according to any one of (1) to (3),
wherein, when transmission and reception by the first communication unit are scheduled at the same timing by the communication control apparatus after the deterioration of the reception quality is detected by the detecting unit, the first communication unit does not transmit a signal at the timing.

(5) The terminal apparatus according to any one of (1) to (4),
wherein the first wireless communication scheme is an LTE scheme, and the second wireless communication scheme is a wireless LAN scheme.

(6) The terminal apparatus according to any one of (1) to (5),
wherein the reporting unit transmits a message to report the deterioration of the reception quality to the communication control apparatus through the first communication unit.

(7) The terminal apparatus according to any one of (1) to (5),
wherein the reporting unit transmits a message to report the deterioration of the reception quality to the communication control apparatus through the second communication unit.

(8) A communication control apparatus comprising:
a first communication unit that performs communication according to a first wireless communication scheme using frequency division duplex;
a scheduling unit that schedules communication by the first communication unit; and
a detecting unit that detects deterioration of reception quality due to generation of communication performed according to the first wireless communication scheme and communication performed according to a second wireless communication scheme different from the first wireless communication scheme at the same timing,
wherein, when the deterioration of the reception quality is detected by the detecting unit, the scheduling unit schedules the communication by the first communication unit preferentially at a timing when the reception quality is not deteriorated.

(9) The communication control apparatus according to (8),
wherein the detecting unit detects a message reporting the deterioration of the reception quality that is received from a terminal apparatus performing communication according to both the first wireless communication scheme and the second wireless communication scheme,
the reception quality shows quality of a downlink signal received according to the first wireless communication scheme by the terminal apparatus, and
when the deterioration of the reception quality is detected by the detecting unit, the scheduling unit schedules transmission of the downlink signal to the terminal apparatus preferentially at the timing when an uplink signal is not transmitted from the terminal apparatus.

(10) The communication control apparatus according to (8), further comprising:
a second communication unit that performs communication according to the second wireless communication scheme,
wherein the reception quality shows quality of an uplink signal received by the first communication unit, and
when the deterioration of the reception quality is detected by the detecting unit, the scheduling unit schedules reception of the uplink signal by the first communication unit preferentially at the timing when a signal is not transmitted by the second communication unit.

(11) The communication control apparatus according to any one of (8) to (10),
wherein the scheduling unit schedules the communication by the first communication unit preferentially at the timing until a predetermined period passes.

(12) The communication control apparatus according to any one of (8) to (11),
wherein the first wireless communication scheme is an LTE scheme, and
the second wireless communication scheme is a wireless LAN scheme.

(13) A wireless communication system comprising:
a communication control apparatus that schedules communication performed according to a first wireless communication scheme using frequency division duplex; and
a terminal apparatus that includes a first communication unit that performs communication according to the first wireless communication scheme, a second communication unit that performs communication according to a second wireless communication scheme different from the first wireless communication scheme, a detecting unit that detects deterioration of reception quality of the first communication unit due to generation of the communication by the first communication unit and the communication by the second communication unit at the same timing, and a reporting unit that reports the deterioration of the reception quality to the communication control apparatus, when the deterioration of the reception quality is detected by the detecting unit, wherein, when the deterioration of the reception quality is reported from the terminal apparatus, the communication control apparatus schedules the communication performed according to the first wireless communication scheme preferentially at a timing when the reception quality is not deteriorated.

(14) A communication control method that is executed by a terminal apparatus which includes a first communication unit performing communication according to a first wireless communication scheme using frequency division duplex and a second communication unit performing communication according to a second wireless communication scheme different from the first wireless communication scheme, the communication control method comprising:

detecting deterioration of reception quality of the first communication unit due to generation of the communication by the first communication unit and the communication by the second communication unit at the same timing, and reporting the deterioration of the reception quality to a communication control apparatus scheduling the communication by the first communication unit, when the deterioration of the reception quality is detected.

The present disclosure contains subject matter related to that disclosed in Japanese Priority Patent Application JP 2011-170035 filed in the Japan Patent Office on Aug. 3, 2011, the entire content of which is hereby incorporated by reference.

What is claimed is:

1. A terminal apparatus comprising:
   a first communication unit that performs communication according to a first wireless communication scheme using frequency division duplex;
   a second communication unit that performs communication according to a second wireless communication scheme different from the first wireless communication scheme;
   a detecting unit that detects deterioration of reception quality of the first communication unit due to generation of the communication by the first communication unit and the communication by the second communication unit at the same timing; and
   a reporting unit that reports the deterioration of the reception quality to a communication control apparatus scheduling the communication by the first communication unit, when the deterioration of the reception quality is detected by the detecting unit;
   wherein the reporting unit transmits a message to report the deterioration of the reception quality to the communication control apparatus through the second communication unit.

2. The terminal apparatus according to claim 1,
   wherein the detecting unit detects the deterioration of the reception quality, based on a correlation between a signal showing the reception quality and a signal showing transmission timing of a signal by the first communication unit or the second communication unit.

3. The terminal apparatus according to claim 2,
   wherein the detecting unit determines the reception quality using a channel quality indicator measured for a report to the communication control apparatus.

4. The terminal apparatus according to claim 1,
   wherein, when transmission and reception by the first communication unit are scheduled at the same timing by the communication control apparatus after the deterioration of the reception quality is detected by the detecting unit, the first communication unit does not transmit a signal at the timing.

5. The terminal apparatus according to claim 1,
   wherein the first wireless communication scheme is an LTE scheme, and
   the second wireless communication scheme is a wireless LAN scheme.

6. The terminal apparatus according to claim 1,
   wherein the reporting unit transmits a message to report the deterioration of the reception quality to the communication control apparatus through the first communication unit.

* * * * *